US009980507B2

United States Patent
Vurma et al.

(10) Patent No.: US 9,980,507 B2
(45) Date of Patent: May 29, 2018

(54) STABLE CONCENTRATED LIQUID HUMAN MILK FORTIFIER

(75) Inventors: Mustafa Vurma, Dublin, OH (US); Jeffrey M. Boff, Columbus, OH (US); Gary E. Katz, Columbus, OH (US)

(73) Assignee: ABBOTT LABORATORIES, Abbott Park, IL (US)

(*) Notice: Subject to any disclaimer, the term of this patent is extended or adjusted under 35 U.S.C. 154(b) by 162 days.

(21) Appl. No.: 13/509,562

(22) PCT Filed: Oct. 28, 2011
(Under 37 CFR 1.47)

(86) PCT No.: PCT/US2011/058365
§ 371 (c)(1),
(2), (4) Date: May 11, 2012

(87) PCT Pub. No.: WO2012/061242
PCT Pub. Date: May 10, 2012

(65) Prior Publication Data
US 2012/0276251 A1    Nov. 1, 2012

Related U.S. Application Data

(60) Provisional application No. 61/409,150, filed on Nov. 2, 2010.

(51) Int. Cl.
*A23L 2/00* (2006.01)
*A23L 33/18* (2016.01)
(Continued)

(52) U.S. Cl.
CPC ............. *A23L 33/18* (2016.08); *A23L 29/219* (2016.08); *A23L 29/272* (2016.08)

(58) Field of Classification Search
CPC . A23L 1/05223; A23V 2002/10; A23C 9/005; A23C 9/1544; A23C 9/1206
(Continued)

(56) References Cited

U.S. PATENT DOCUMENTS 4,414,238 A    11/1983    Schmidl
4,670,268 A *  6/1987    Mahmoud ....................... 426/72
(Continued)

FOREIGN PATENT DOCUMENTS

CN    101177540    5/2008
CN    102028033    4/2011
(Continued)

OTHER PUBLICATIONS

Halken et al., Comparison of a partially hydrolyzed infant formula with two extensively hydrolyzed formulas for allergy prevention: a prospective, randomized study, Pediatr Allergy Immunol. Aug. 2000;11(3):149-61 (abstract) (Halken).*
(Continued)

*Primary Examiner* — D. Lawrence Tarazano
*Assistant Examiner* — Philip Dubois
(74) *Attorney, Agent, or Firm* — Calfee, Halter & Griswold LLP

(57) ABSTRACT

Disclosed are concentrated liquid human milk fortifiers including extensively hydrolyzed casein and a stabilizer system. The stabilizer system includes an OSA-modified corn starch in combination with a low acyl gellan gum. In one embodiment, the concentrated liquid human milk fortifier is hypoallergenic and includes extensively hydrolyzed casein as the sole protein source in combination with the OSA-modified corn starch and low acyl gellan gum.

18 Claims, 10 Drawing Sheets

(51) Int. Cl.
 *A23L 29/219* (2016.01)
 *A23L 29/269* (2016.01)
 *A61K 6/00* (2006.01)

(58) Field of Classification Search
 USPC .......................................... 426/580, 74, 73
 See application file for complete search history.

(56) References Cited

U.S. PATENT DOCUMENTS

| | | | |
|---|---|---|---|
| 4,690,820 | A | 9/1987 | Simko |
| 4,692,340 | A | 9/1987 | Grutte et al. |
| 4,753,926 | A | 6/1988 | Lucas et al. |
| 4,871,768 | A | 10/1989 | Bistrian et al. |
| 5,013,569 | A | 5/1991 | Rubin |
| 5,221,545 | A | 6/1993 | Borschel et al. |
| 5,340,603 | A | 8/1994 | Neylan et al. |
| 5,416,077 | A | 5/1995 | Hwang et al. |
| 5,492,899 | A | 2/1996 | Masor et al. |
| 5,554,589 | A | 9/1996 | Dewille et al. |
| 5,681,600 | A | 10/1997 | Antinone et al. |
| 5,700,590 | A | 12/1997 | Masor et al. |
| 5,869,118 | A * | 2/1999 | Morris et al. ............... 426/72 |
| 5,886,037 | A | 3/1999 | Klor et al. |
| 5,897,892 | A | 4/1999 | Jolivet et al. |
| 5,908,647 | A | 6/1999 | Golightly et al. |
| 6,020,015 | A | 2/2000 | Gaull |
| 6,039,985 | A | 3/2000 | Kamarei |
| 6,066,344 | A | 5/2000 | Golightly et al. |
| 6,096,358 | A | 8/2000 | Murdick et al. |
| 6,136,858 | A | 10/2000 | Kuchan et al. |
| 6,194,379 | B1 * | 2/2001 | McEwen et al. ............ 514/5.7 |
| 6,200,950 | B1 | 3/2001 | Mark et al. |
| 6,227,261 | B1 | 5/2001 | Das |
| 6,270,827 | B1 | 8/2001 | Gaull et al. |
| 6,294,206 | B1 | 9/2001 | Barrett-Reis et al. |
| 6,371,319 | B2 | 4/2002 | Yeaton et al. |
| 6,472,003 | B2 | 10/2002 | Barrett-Reis et al. |
| 6,495,599 | B2 | 12/2002 | Auestad et al. |
| 2001/0029267 | A1 | 10/2001 | Kuchan et al. |
| 2002/0004527 | A1 | 1/2002 | Auestad et al. |
| 2002/0031576 | A1 | 3/2002 | Barrett-Reis et al. |
| 2002/0142025 | A1 | 10/2002 | Hageman |
| 2002/0182243 | A1 | 12/2002 | Medo |
| 2003/0021868 | A1 | 1/2003 | Barrett-Reis et al. |
| 2003/0104078 | A1 | 6/2003 | Barrett-Reis et al. |
| 2003/0175358 | A1 | 9/2003 | Euber et al. |
| 2004/0081708 | A1 | 4/2004 | Baxter |
| 2004/0086617 | A1 | 5/2004 | Gazzolo et al. |
| 2006/0204632 | A1 | 9/2006 | Barrett-Reis et al. |
| 2006/0233915 | A1 | 10/2006 | Puski et al. |
| 2007/0098849 | A1 | 5/2007 | Barrett-Reis et al. |
| 2007/0166354 | A1 | 7/2007 | Barrett-Reis |
| 2007/0196506 | A2 | 8/2007 | Euber et al. |
| 2008/0286416 | A1 | 11/2008 | Euber et al. |
| 2010/0104696 | A1 * | 4/2010 | Banavara et al. ............ 426/72 |
| 2014/0322425 | A1 | 10/2014 | Barrett-Reis et al. |

FOREIGN PATENT DOCUMENTS

| | | |
|---|---|---|
| EP | 0799577 | 4/2000 |
| EP | 0990704 | 4/2000 |
| EP | 1474003 | 11/2004 |
| EP | 1533369 | 5/2005 |
| WO | WO 03/015538 A1 | 2/2003 |
| WO | 03065816 | 8/2003 |
| WO | 2004032651 | 4/2004 |
| WO | 2005051088 | 6/2005 |
| WO | 2005122790 | 12/2005 |
| WO | 2006112998 | 10/2006 |
| WO | 2007050521 | 5/2007 |
| WO | 2013101367 | 7/2013 |

OTHER PUBLICATIONS

Ross Nutrition, TwoCal® HN, Vanilla, 8 fl. oz, product label dated Apr. 17, 2003.
Ross Nutrition, TwoCal® HN, Butter Pecan, 8 fl. oz product label dated Apr. 17, 2003.
Ross Medical Nutrition, TwoCal® HN, Butter Pecan 8 fl. oz, product label dated Jan. 25, 2000.
Medical Nutrition, TwoCal® HN, 33.8 fl. oz, Ready-To-Hang®, product packaging dated Aug. 8, 2002.
Ross Nutrition, TwoCal® HN, 33.8 fl. oz, Ready-To-Hang®, product packaging dated Jun. 18, 2003.
Ross Products Division Abbott Laboratories, Similac® Lactose Free Advance® Infant Formula with Iron, 13 fl. oz., Concentrated Liquid, product packaging dated Jan. 7, 2003.
Ross Products Division Abbott Laboratories, Pivot 1.5 cal, 33.8 fl. oz, Ready-To-Hang®, product packaging dated Mar. 19, 2004.
Ross Nutrition, Pivot 1.5 cal, 33.8 fl. oz, Ready-To-Hang®, product packaging dated Mar. 22, 2004.
Office Action from U.S. Appl. No. 11/370,610 dated Jan. 17, 2014.
Extended European Search Report for EP Application No. 13004731.9 dated Nov. 25, 2013.
Applicant-Initiated Interview Summary for U.S. Appl. No. 11/370,610 dated Apr. 18, 2014.
First Office Action from CN Application No. 201180063402.0 dated Mar. 10, 2014.
Written Opinion in SG Application No. 200705680-7 mailed Sep. 16, 2008 (received from foreign associate Nov. 2013).
Submission by Abbott (patentee) in Opposition of EP1871182 dated Jan. 21, 2014.
Submission by NV Nutrica (opposer) in Opposition of EP1871182 dated Jan. 23, 2014 with list of references.
Submssion by NV Nutricia (opposer) in Opposition of EP1871182 dated Jan. 23, 2014.
Submission by Nestec (opponent) in Opposition of EP1871182 submitted Jan. 24, 2014.
Submission by Nestec (opponent) in Opposition of EP1871182 submitted Jan. 24, 2014 with list of references.
Submission by Abbott (patentee) in Opposition of EP1871182 dated Mar. 6, 2014.
Submision by Nutricia (opponent) in Opposition of EP1871182 dated Mar. 11, 2014.
Minutes of Oral Proceeding in Opposition of EP1871182 mailed May 19, 2014.
Decision of Opposition Division in Opposition of EP1871182, dated May 19, 2014.
Decision revoking European Patent in Opposition of EP 1871182, dated May 19, 2014.
Grounds for Decision of Opposition Division in Opposition of EP1871182, dated May 19, 2014.
Abrams, et al., "Calcium and Vitamin D Requirements of Enterally Fed Preterm Infants," Pediatrics, http://pediatrics.aappublications.org/content/early/2013/04/24/peds.2013-0420.
Agostini, et al., Enteral Nutrient Supply for Preterm Infants: Commentary from the European Society for Paediatric Gastroenterology, Hepatology, and Nutrition Committee on Nutrition, JPGN, vol. 50, No. 1, Jan. 2010.
Carlson et al., "Effect of long-chain n-3 fatty acid supplementation on visual acuity and growth of perterm infants with and without bronchopulmonary dysplasia," Am. J. Clin. Nutr., (1996) vol. 63, pp. 687-697.
First Auxiliary Request (claims) submitted with Submission by Abbott (patentee) in Opposition of EP1871182 dated Mar. 6, 2014.
Second Auxiliary Request (claims) submitted with Submission by Abbott (patentee) in Opposition of EP1871182 dated Mar. 6, 2014.
Third Auxiliary Request (claims) submitted with Submission by Abbott (patentee) in Opposition of EP1871182 dated Mar. 6, 2014.
Main Request (claims) submitted with Submission by Abbott (patentee) in Opposition of EP1871182 dated Mar. 6, 2014.
http://abbottnutrition.com/brands/products/similac-human-milk-fortifier-concentrated-liquid (last accessed Jan. 23, 2014).
Human Milk Fortifiers, http://vuneo.org/npentnutfort2.htm (last accessed Jan. 15, 2014).

(56) References Cited

OTHER PUBLICATIONS

Human Milk Fortifiers, http://vuneo.org/npentnutfort2.htm (modified Feb. 4, 2009).
Hurrell, et al., "Mechanisms of heat damage in proteins. 8. The role of sucrose in the susceptibility of protein foods to heat damage," Br. J. Nutr. (1977) 38, pp. 285-297.
Keowmaneechai et al., "Influence of EDTA and Citrate on Physicochemical Properties of Whey Protein-Stabilized Oil-in-Water Emulsions Containing CaCl2," J. Agric. Food Chem., 50, pp. 7145-7153 (2002).
Malec, et al., "Sugar formulation effect on available lysine content of dulce de leche," Journal of Dairy Research (1999), 66, pp. 335-339.
Ozdemir, et al., "A newborn with lipemia rednails," Opthalmic Surg Lasers Imaging, vol. 34, No. 3, (2003) abstract.
Roig, et al., "Calcium bioavailability in human milk, cow milk and infant formulas—comparison between dialysis and solubility methods,"—abstract Food Chemistry, vol. 65(3), pp. 353-357 (1999).
Roig, et al., "Effects of different infant formula components on calcium dialysability," Eur. Food Res. Technol. (1999), 209:93-96.
Ryan, Alan et al., "Effect of DHA-Containing Formula on Growth of Preterm Infants to 59 Weeks Postmenstrual Age", American Journal of Human Biology vol. 11, pp. 457-467 (1999).
Similac Human Milk Fortifier Concentrated Liquid, Abbott Laboratories, http://static.abbottnutrition.com/cms-prod/abbottnutrition.com/img/Similac-Human-Milk-Fortifier-Concentrated-Liquid.pdf (2013).
Thermal technologies in food processing, edited by P. Richardson, Woodhead Publishing Limited, 2001, pp. 40, 149-150).
Unified Listing of Documents from Opposition to EP-B-1871182 in the name of Abbott Laboratories by Nestec S.A. (O1) and N.V. Nutrica (O2) dated Mar. 6, 2014.
Formulaction, "Stability of Various Beverage Emulsions," pp. 1-7 (2009).
Gerstner, G. "How to Fortify Beverages with Calcium," Food and Marketing Technology, pp. 16-17 (2003).
Munchbach, et al., "Calcium Fortification in Dairy Products," Food and Marketing Technology, pp. 4-5 (2010).
Williams, R. et al., "Production of Calcium-Fortified Milk Powders Using Soluble Calcium Salts," Lait, 85, pp. 369-381 (2005).
U.S. Appl. No. 60/660,087, filed Mar. 5, 2006—Barrett-Reis et al.
Ross, Abbott Laboratories, "Similac Natural Care Advance, Low Iron Human Fortifier (HMF)," http://RPDCON40.Ross.com/PN/PediatricProducts.nsf/Web_Ross. Com_XML_PediatricNutrition/20CB14E07C70552785256A80000754761?Opendocument, last visited May 23, 2008.
Amendment with RCE for U.S. Appl. No. 11/370,610 dated Jun. 16, 2014.
International Preliminary Report on Patentability from PCT/US06/08354 dated Sep. 12, 2007.
Non-final Office Action from U.S. Appl. No. 11/370,610 dated Aug. 14, 2014.
Office Action in U.S. Appl. No. 11/370,610 dated Feb. 5, 2015.
Response to Office Action from U.S. Appl. No. 11/370,610 dated Nov. 13, 2014 with Declaration of Cynthia Black.
Moro et al., "Fortification of Human Milk: Evaluation of a Novel Fortification Scheme and of a New Fortifier", Journal of Pediatric Gastroenterology and Nutrition, 20:162-172, 1999.
Moyer-Mileur, et al., "Evaluation of Liquid or Powdered Fortification of Human Milk or Growth and Bone Mineralization Status of Preterm Infants", Journal of Pediatric Gastroenerology and Nutrition, vol. 15, No. 4, 1992, pp. 370-374, XP000933692.
Porcelli, et al., "A New Human Milk Fortifier (HMF): A Multicenter Report", Pediatric Research, Abstract No. 200, vol. 40, No. 3, 1996.
Raschko, et al., "Comparison of Fortified Human Milk (Using Similac Natural Care® with Experimental LBW Infant Formula", Pediatric Research, vol. 21, No. 4, Part 2, 1987, p. 435A, XP000933586.
Ronnholm, et al., Human Milk Protein and Medium-Chain Triglyceride Oil Supplementation of Human Milk: Plasma Amino Acids in Very Low-Birth-Weight Infants, Pediatrics, vol. 74, No. 5, 1984, pp. 792-799, XP000933587.
Sanchez-Hidalgo, et al., "A Fortifier Comprising Protein, Vitamins, and Calcium-glycerophosphate for Preterm Human Milk," Archives of Medical Research 31 (2000) 564-570.
Sankaran, et al., "A randomized, controlled evaluation of two commercially available human breast milk fortifiers in healthy preterm neonates", Journal of the American Dietetic Association, Nov. 1996; 96: 1145-1149.
Schanler, et al., "Fortified Human Milk Improves the Health of the Premature Infant", Abstract No. 217, Pediatric Research, vol. 40, No. 3, 1996.
Schanler, et al., "Fatty Acid Soaps May Be Responsible for Poor Fat Absorption in Premature Infants Fed Fortified Human Milk (F HM)", Abstract No. 1707, Pediatric Research, Apr. 1999, vol. 45, No. 4, p. 290A.
Schanler et al., "Feeding Strategies for Premature Infants: Beneficial Outcomes of Feeding Fortified Human Milk Versus Preterm Formula", Pediatrics, vol. 103, No. 6, Jun. 6, 1999, pp. 1150-1157.
Schanler, et al., "Postnatal attainment of intrauterine macromineral accretion rates in low birth weight infants fed fortified human milk", Journal of Pediatrics, Mar. 1995, vol. 126, No. 3, pp. 441-447.
Schanler "Suitability of human milk for low-birth weight infant", Clinics in Perinatology, 22, pp. 207-222, 1995.
Trocki, et al., "Intact Protein Versus Free Amino Acids in the Nutritional Support of Thermally Injured Animals," Journal of Parenteral and Enteral Nutrition; pp. 139-145 Mar. 1, 1986.
Van Acker et al., "Outbreak of Necrotizing Enterocolitis Associated with Enterobacter Sakazakii in Powdered Milk Formula," Journal of Clinical Microbiology, vol. 39, No. 1, pp. 293-297, 2001.
Unified Listing of Documents from Opposition to EP-B-1871182 in the name of Abbott Laboratories by Nestec S.A. (O1) and N.V. Nutrica (O2).
Information Regarding Oral Proceedings of Mar. 25, 2014 from EP Application No. 06737520.4 (14 pages) dated Aug. 30, 2013.
Rule 71(3) Communication for EPO in European Patent Application No. 11782324.5 dated Apr. 17, 2013.
The International Search Report and the Written Opinion of the International Searching Authority for PCT/US2011/058365, dated Dec. 23, 2011.
International Preliminary Report on Patentability from PCT/US2011/058365 mailed May 16, 2013.
International Search Report and Written Opinion from PCT/US2006/008354 mailed Sep. 1, 2006.
Non-Final Office Action from U.S. Appl. No. 11/370,610 mailed Sep. 17, 2008.
Response to Non-Final Office Action from U.S. Appl. No. 11/370,610 dated Feb. 11, 2009.
Non-Final Office Action from U.S. Appl. No. 11/370,610 mailed Apr. 29, 2009.
Response to Non-Final Office Action from U.S. Appl. No. 11/370,610 dated Aug. 28, 2009.
Non-Final Office Action from U.S. Appl. No. 11/370,610 mailed Nov. 20, 2009.
Response to Non-Final Office Action from U.S. Appl. No. 11/370,610 dated May 3, 2010.
Final Office Action from U.S. Appl. No. 11/370,610 mailed Jul. 15, 2010.
Response After Final from U.S. Appl. No. 11/370,610 dated Jan. 18, 2011.
Non-Final Office Action from U.S. Appl. No. 11/370,610 mailed Mar. 1, 2011.
Response to Non-Final Office Action from U.S. Appl. No. 11/370,610 dated Aug. 31, 2011.
Final Office Action from U.S. Appl. No. 11/370,610 mailed Nov. 25, 2011.
Response to Office Action from U.S. Appl. No. 11/370,610 dated Feb. 27, 2012.
Non-Final Office Action from U.S. Appl. No. 11/370,610 mailed May 23, 2012.
Response to Non-Final Office Action from U.S. Appl. No. 11/370,610 dated Aug. 23, 2012.

(56) References Cited

OTHER PUBLICATIONS

Final Office Action from U.S. Appl. No. 11/370,610 mailed Nov. 2, 2012.
Response to Office Action from U.S. Appl. No. 11/370,610 dated Dec. 26, 2012.
Non-Final Office Action from U.S. Appl. No. 11/370,610 mailed Apr. 25, 2013.
Office Action from Canadian Patent Application No. 2,537,452 dated Oct. 16, 2012.
Office Action from Israeli Patent Application No. 185075 reported Feb. 8, 2011.
Office Action from Israeli Patent Application No. 215834 reported Apr. 30, 2012.
Communication Pursuant to Article 94(3) EPC from European Patent Application No. 06 737 520.4 dated May 8, 2009.
Reply to Article 94(3) Communication from European Patent Application No. 06737520.4 dated Sep. 15, 2009.
Notice of Opposition with Brief of EP1871182 dated Jan. 20, 2012 (Nestec).
Response to Notice of Opposition of EP1871182 dated Sep. 13, 2012.
Notice of Allowance from Canadian Patent Application No. 2,537,452 dated Apr. 29, 2013.
Amendment Filed at Time of Filing EP Application No. 06737520.4 dated Oct. 5, 2007.
Notice of Opposition with Brief of EP1871182 dated Feb. 7, 2012 (Nutricia).
Barrett-Reis, et al., "Enhanced Growth of Preterm Infants Fed a New Powdered Human Milk Fortifier: A Randomized, Controlled Trial", Pediatrics, vol. 106, No. 3, Sep. 2000, pp. 581-588.
Bhatia, et al., "Human Milk Supplementation: Delivery of Energy, Calcium, Phosphorus, Magnesium, Copper and Zinc", American Journal of Diseases of Children, vol. 142, No. 4, 1988, pp. 445-447. XP000933462.
Boehm, "Nitrogen and fat balances in very low birth weight infants fed human milk fortified with human milk or bovine milk protein", European Journal of Pediatrics, vol. 152, No. 3, 1993, pp. 236-239, XP00929747.
Bowes & Church's "Food Values of Portions Commonly Used," 1998 Lippincott Williams & Wilkins, 17th Ed., p. 225.
Chan, Gary M., "Powdered fortifier effects on preterm human milk's antibacterial action.", Pediatric Research, vol. 53, No. 4, Part 2, Apr. 2003 (Apr. 2003), p. 421A, XP009043910.
Davies, D.P. "Adequacy of expressed breast milk for early growth of preterm infants". Archives of Disease in Childhood, 52, 0. 296-301, 1997.
"Dictionnaire vidal", 1990, Editions De Vidal, Paris, XP002144922, p. 100: materna comlet.
Enfamil® Human Milk Fortifier Label, Mead Johnson & Company, 1983/1987.
Enfamil® Human Milk Fortifier Label, Mead Johnson & Company, 2000.
Experimental Report—Experiment to Concentrate Similac Natural Care—D19 from Opposition EP1871182.
Joint FAO/WHO Food Standards Programme; Report of the Thirty-Sixth Session of the Codex Committee on Food Hygiene; 2004.
FDA/CFSAN. Health professionals letter on Enterobacter sakazakii infections associated with use of powdered (dry) infant formulas in neonatal intensive care units. Apr. 11, 2002; revised Oct. 10, 2002. www.cfsan.fda.gov/~dms/inf-ltr3.html.
Fenton, et al., "Osmolality of Breast Milk Enriched with Added Formula Powders", Abstract No. 1657, Pediatric Research, Apr. 1999, vol. 45, No. 4, p. 281A.
Franz, et al., "Prospective Randomized Trial of Early Versus Late Enteral Iron Supplementation in Infants with a Birth Weight of Less than 1301 Grams", Pediatrics, vol. 106, No. 4, Oct. 2000, pp. 700-706.

"Human Milk Fortifiers," Version 1.0 Jan. 21, 2002-Oct. 16, 2002, http://vuneo.org/npentnutfort.htm.
Klein,C.J., Editor, "Nutrient Requirements for Preterm Infant Formulas," The Journal of Nutrition; 132;1395S-1577S; 2002.
Lucas, et al., "Randomized outcome trial of human milk fortification and development outcome in preterm infants", Am J. Clin Nutr 1996; 64: 142-51.
McNaught, et al., "An Evaluation of a New Human Milk Fortifier in Preterm Infants", Journal of Investigative Medicine, vol. 48, p. 93A, Jan. 2000.
Mead Johnson & Company, Enfamil, Your First Choice Just Got Better, LA3012 New Oct. 2000.
Mead Johnson Nutritional Division, Product Handbook Enfamil Human Milk Fortifier, L-B641-8-83.
Meeting the Special Nutrient Needs of Low-Birth-Weight and Premature Infants with Similac® Human Milk Fortifier or Similac Natural Care®, Ross Products Division Abbott Laboratories, Feb. 2000.
International Search Report and Written Opinion from PCT/US2013/075952 dated Mar. 4, 2014.
International Preliminary Report on Patentability from PCT/US2013/075952 dated Jun. 23, 2015.
Amendment in U.S. Appl. No. 11/370,610 dated May 5, 2015.
Final Office Action in U.S. Appl. No. 11/370,610 dated Jul. 27, 2015.
Notice of Appeal in U.S. Appl. No. 11/370,610 dated Oct. 27, 2015.
Appeal Brief filed in U.S. Appl. No. 11/370,610 dated Jan. 27, 2016.
Examiner's Answer to Appeal Brief in U.S. Appl. No. 11/370,610 dated Jun. 17, 2016.
Reply Brief filed in U.S. Appl. No. 11/370,610 dated Aug. 12, 2016.
Office Action in U.S. Appl. No. 14/307,871 dated Apr. 12, 2016.
Response in U.S. Appl. No. 14/307,871 dated Sep. 9, 2016.
Final Office Action in U.S. Appl. No. 14/307,871 dated Dec. 15, 2016.
Amendment in U.S. Appl. No. 14/307,871 dated Mar. 15, 2017.
Non-Final Office Action in U.S. Appl. No. 14/653,102 dated Jun. 26, 2017.
Office Action from Canadian Patent Application No. 2,895,207 dated Oct. 5, 2016.
First Office Action from CN Application No. 201380073163.6 dated Jun. 2, 2016.
Notice of Appeal by Patentee Abbott Laboratories dated Jun. 16, 2014 in Opposition of EP Patent No. 1871182.
Notice of Appeal by Opponent NV Nutricia dated Jul. 15, 2014 in Opposition of EP Patent No. 1871182.
Statement of Grounds of Appeal by Opponent NV Nutricia dated Sep. 17, 2014 in Opposition of EP Patent No. 1871182.
Statement of Grounds of Appeal by Patentee Abbott Laboratories dated Sep. 25, 2014 in Opposition of EP Patent No. 1871182.
Patentee Abbott Laboratories' Reply dated Jan. 14, 2015 to Opponent NV Nutricia Notice of Appeal in Opposition of EP Patent No. 1871182.
Opponent NV Nutricia Letter dated Jan. 29, 2015 Relating to Appeal in EP Patent No. 1871182.
Opponent NV Nutricia Reply to Appeal in Opposition of EP Patent No. 1871182 dated Jan. 29, 2015.
Opponent Nestec SA Reply to the Statement of Grounds of Appeal in Opposition of EP Patent No. 1871182 dated Feb. 10, 2015.
Office Action in Malaysia Patent Application No. PI 2013001556 dated Nov. 30, 2016.
Examination Report from New Zealand Patent Application No. 610,471 dated Oct. 29, 2013.
Further Examination Report from NZ Application No. 610,471 dated Mar. 26, 2014.
Office Action in Taiwan Patent Application No. 100140001 dated Sep. 24, 2015.
Jewell et al, "Nutritional Factors and Visual Function in Premature Infants," Proceedings of the Nutrition Society, vol. 60, No. 2, (May 1, 2001), pp. 171-178.

* cited by examiner

Elastic modula of HMF samples (in the absence of OSA starch and gellan gum, with OSA starch, with gellan gum, and with OSA starch and gellan gum combination) as a function strain.

Dynamic modula of HMF sample in the absence of OSA starch and gellan gum as a function of frequency Dynamic modula of HMF sample containing Gellan gum only as a function of frequency Dynamic modula of HMF sample containing OSA starch and Gellan gum combination as a function of frequency

STABLE CONCENTRATED LIQUID HUMAN MILK FORTIFIER

FIELD OF THE DISCLOSURE

The present disclosure relates to a stable, concentrated liquid human milk fortifier. More particularly, the present disclosure relates to a long term stable, concentrated liquid human milk fortifier including extensively hydrolyzed casein and a stabilizer system comprising an octenyl succinic anhydride modified corn starch and a low acyl gellan gum. In some embodiments, the concentrated liquid human milk fortifier is hypoallergenic.

BACKGROUND OF THE DISCLOSURE

Human milk is generally recognized as an ideal feeding for most infants due to its overall nutritional composition. It is well known and generally accepted that human milk provides infants with unique immunologic and developmental benefits as compared generally to commercially available infant formulas.

For some infants, however, especially preterm infants, human milk does not always meet the complete nutritional needs. Although these infants still generally benefit from human milk, it is often desirable to supplement their human milk feedings with additional nutrients. Initially, these preterm infants may grow more rapidly than many of their term counterparts, and accelerated growth often requires additional nutrition, which is made possible by the use of a human milk fortifier in combination with human milk.

Most of the human milk fortifiers described in the literature and commercially available have been formulated as reconstitutable powders rather than liquids in order to minimize the volume displacement of human milk by the fortifier. Recently, however, liquid human milk fortifiers, and specifically highly concentrated human milk fortifier liquids, have received more attention as an alternative to powders. Although these highly concentrated human milk fortifiers do generally displace slightly more volume that the conventional powders, the liquids have the significant benefit of being commercially sterile as they can be subjected to sufficient heat treatment during manufacturing, including aseptic manufacturing.

It may be advantageous to utilize hydrolyzed proteins in human milk fortifiers. However, as compared to intact proteins, extensively hydrolyzed proteins (i.e., proteins having a degree of hydrolysis of about 20% or more) tend to have poor ability to form long term stable emulsions. Additionally, the presence of high levels of insoluble minerals such as calcium salts may also cause a number of stability issues when used in combination with extensively hydrolyzed proteins. As such, manufacturing long term stable liquid concentrated human milk fortifiers including extensively hydrolyzed proteins have proven difficult.

Many liquid human milk fortifiers have been manufactured with stabilizers, such as carrageenan. The stabilizers act to hold the nutrients and insolubles in solution over time and thus improve long term stability of the product. Although stabilizers such as carrageenan have generally proven to retard precipitation of many ingredients in the liquid nutritional formulations, these types of stabilizers are not permitted in infant formulas and human milk fortifiers in many countries around the world. When stabilizers cannot be used in highly concentrated human milk fortifiers, it can be very difficult to produce a long term stable highly concentrated human milk fortifier.

As such, there is a need for highly concentrated liquid human milk fortifiers that are sufficiently long term stable that include hypoallergenic proteins, such as extensively hydrolyzed casein proteins. Additionally, it would be very beneficial if the highly concentrated human milk fortifier could be formulated to provide additional macro- and micro-nutrients without unwanted mineral fallout during storage.

SUMMARY OF THE DISCLOSURE

The present disclosure is directed to long term stable concentrated liquid human milk fortifiers including extensively hydrolyzed casein and a stabilizer system comprised of an octenyl succinic anhydride modified corn starch and a low acyl gellan gum. The stabilizer system allows for the use of an extensively hydrolyzed casein protein without the associated problems of mineral fallout and poor emulsion stability, and allows for the fortifier, in some embodiments, to be carrageenan-free. The long term stable concentrated liquid human milk fortifiers may be, in some embodiments, hypoallergenic.

The present disclosure is specifically directed to a concentrated liquid human milk fortifier comprising from about 5% to about 50% by weight protein, on a dry weight basis. The concentrated liquid human milk fortifier comprises a stabilizer system comprising an octenyl succinic anhydride modified corn starch and a low acyl gellan gum. At least a portion of the protein is extensively hydrolyzed casein.

The present disclosure is further specifically directed to a concentrated liquid human milk fortifier comprising from about 5% to about 50% by weight extensively hydrolyzed casein protein, on a dry weight basis. The concentrated liquid human milk fortifier comprises a stabilizer system comprising from about 0.6% to about 2.0% by weight of an octenyl succinic anhydride modified corn starch and from about 125 to about 800 ppm low acyl gellan gum.

The present disclosure is further specifically directed to an aseptically-sterilized concentrated liquid human milk fortifier comprising from about 5% to about 50% by weight extensively hydrolyzed casein protein, on a dry weight basis. The concentrated liquid human milk fortifier comprises a stabilizer system comprising from about 0.6% to about 2.0% by weight of an octenyl succinic anhydride modified corn starch and from about 125 to about 800 ppm low acyl gellan gum.

It has been unexpectedly found that stable concentrated liquid human milk fortifiers can be prepared utilizing a synergistic stabilization system that includes an octenyl succinic anhydride modified corn starch in combination with a low acyl gellan gum. When used together, the octenyl succinic anhydride modified corn starch and low acyl gellan gum provide a stable concentrated liquid human milk fortifier that is emulsion stable and highly resistant to mineral fallout such that a homogeneous and precise delivery of macronutrients and micronutrients can be delivered to human milk and consequently will be precisely delivered to preterm infants.

Additionally, it has further been discovered that the stable concentrated liquid human milk fortifiers can advantageously be prepared to include hypoallergenic extensively hydrolyzed casein proteins without disrupting the long term stability or emulsion properties of the fortifier. By utilizing the stabilizer system including the octenyl succinic anhydride modified corn starch and low acyl gellan gum, the concentrated liquid human milk fortifiers may include up to 100% extensively hydrolyzed casein (by weight of the protein component) while maintaining the desired emulsion and stability properties.

DETAILED DESCRIPTION OF THE DISCLOSURE

Figure 1:
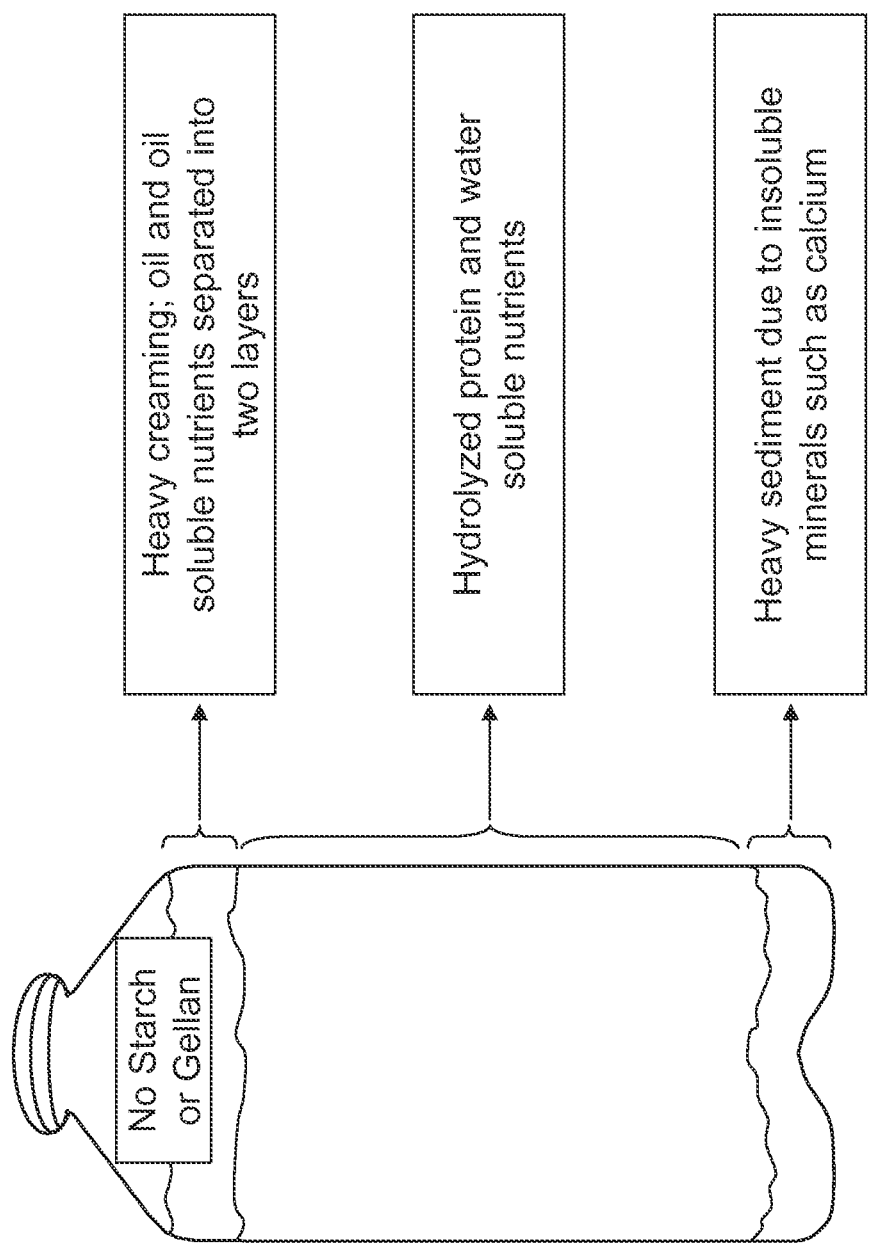
FIG. 1 is a photograph of a plastic container including a concentrated liquid human milk fortifier that does not contain any OSA-modified corn starch or low acyl gellan gum.

The concentrated liquid human milk fortifier compositions of the present disclosure generally comprise protein, fat, carbohydrate OSA-modified starch and low acyl gellan gum. These and other essential or optional elements or limitations of the concentrated liquids and methods of the present disclosure are described in detail hereinafter.

The term "retort packaging" and "retort sterilizing" are used interchangeably herein, and unless otherwise specified, refer to the common practice of filling a container, most typically a metal can or other similar package, with a nutritional liquid and then subjecting the liquid-filled package to the necessary heat sterilization step, to form a sterilized, retort packaged, nutritional liquid product.

The term "aseptic packaging" as used herein, unless otherwise specified, refers to the manufacture of a packaged product without reliance upon the above-described retort packaging step, wherein the nutritional liquid and package are sterilized separately prior to filling, and then are combined under sterilized or aseptic processing conditions to form a sterilized, aseptically packaged, nutritional liquid product.

The term "infant" as used herein, refers generally to individuals less than about 1 year of age, actual or corrected.

The term "preterm" are used herein refers to those infants born at less than 37 weeks gestation, have a birth weight of less than 2500 gm, or both.

The terms "fortifier solids" or "total solids", unless otherwise specified, are used interchangeably herein and refer to all material components of the compositions of the present disclosure, less water.

The term "hypoallergenic" as used herein means that the concentrated liquid human milk fortifier has a decreased tendency to provoke an allergic reaction in a preterm or term infant as compared to non-hypoallergenic fortifiers.

The term "stable" as used herein means that the concentrated liquid human milk fortifier is resistant to separation and precipitation for time period after manufacture of at least three months, and preferably at least six months.

All percentages, parts and ratios as used herein, are by weight of the total composition, unless otherwise specified. All such weights as they pertain to listed ingredients are based on the active level and, therefore, do not include solvents or by-products that may be included in commercially available materials, unless otherwise specified.

Numerical ranges as used herein are intended to include every number and subset of numbers within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

The various embodiments of the concentrated liquid human milk fortifiers of the present disclosure may also be substantially free of any optional or selected essential ingredient or feature described herein, provided that the remaining concentrated liquid human milk fortifier still contains all of the required ingredients or features as described herein. In this context, and unless otherwise specified, the term "substantially free" means that the selected concentrated liquid human milk fortifier contains less than a functional amount of the optional ingredient, typically less than 0.1% by weight, and also including zero percent by weight of such optional or selected essential ingredient.

The concentrated liquid human milk fortifiers and corresponding manufacturing methods of the present disclosure can comprise, consist of, or consist essentially of the essential elements and limitations of the disclosure as described herein, as well as any additional or optional ingredients, components, or limitations described herein or otherwise useful in the concentrated liquid human milk fortifier.

Product Form

The concentrated liquid human milk fortifiers of the present disclosure have a solids content of at least about 20%, or even at least about 25%, including from about 25% to about 45%, and further including from about 29% to about 32%. The concentrated liquid human milk fortifiers are liquids that are capable of being poured directly from a package containing them into human milk or formula.

The concentrated liquid human milk fortifiers are generally formulated to have a caloric density of at least about 1.25 kcal/ml (37 kcal/fl oz), including from about 1.4 kcal/ml (42 kcal/fl oz) to about 5 kcal/ml (149 kcal/fl oz), and also including from about 1.5 kcal/ml (44 kcal/fl oz) to about 2.5 kcal/ml (74 kcal/fl oz), and also including from about 1.9 kcal/ml (56 kcal/fl oz) to about 2.0 kcal/ml (59 kcal/fl oz).

The concentrated liquid human milk fortifiers include packaged compositions further comprising a suitable unit dose package or container. These unit dose packages are single use containers that alone, or in combination with other unit dose packages, provide sufficient human milk fortifier to supplement human milk for immediate use, e.g., preferably within 8-24 hours, more preferably within 0-4 hours, of mixing with human milk.

The amount or volume of concentrated liquid human milk fortifier in each unit dose package includes those embodiments in which the package contains an amount suitable to prepare an infant's next feeding. These unit dose packages typically contain sufficient fortifier to provide from about 0.5 g to about 10 g of fortifier solids, more typically from about 0.8 g to about 7.5 g of fortifier solids, and even more typically from about 0.85 g to about 6.0 g, of fortifier solids.

The concentrated liquid human milk fortifiers of the present disclosure are preferably formulated so as to provide fortified human milk having an osmolality of less than about 500 mOsm/kg water, preferably from about 300 mOsm/kg water to about 400 mOsm/kg water. Based on the disclosure herein, one skilled in the art can readily formulate the concentrated liquid human milk fortifier with the appropriate carbohydrate sources and corresponding DE (dextrose equivalence) values to obtain or otherwise provide for the targeted osmolality of the human milk fortifier when combined with human milk.

The term "unit dose" as used herein refers to individual, single-use, packages of concentrated liquid human milk fortifier containing an amount of human milk fortifier that can be used in a preparation of an infant feeding. The amount of fortified human milk prepared for a premature infant, for example, typically ranges from 25 ml to 150 ml a day. Consequently, a single unit dose is the appropriate amount of fortifier solids to fortify a 25 ml preparation. Multiple packages can be used to prepare larger feeding volumes, especially for term infants.

Extensively Hydrolyzed Casein Protein

The concentrated liquid human milk fortifiers of the present disclosure include hypoallergenic extensively hydrolyzed casein as a protein source. Generally, the concentrated liquid human milk fortifiers will include at least about 35%, including at least about 50%, including at least about 60%, including at least about 75%, including at least about 90% and further including about 100% extensively hydrolyzed casein, by total weight of protein in the concentrated human milk fortifier. In one desirable embodiment of the present disclosure, the concentrated liquid human milk fortifier includes 100% extensively hydrolyzed casein, by total weight of the protein in the concentrated human milk fortifier. In this desirable embodiment, the concentrated liquid human milk fortifier is hypoallergenic. In some embodiments, the concentrated liquid human milk fortifier will include from about 35% to 100%, including from about 50% to 100%, further including from about 75% to 100% extensively hydrolyzed casein, by total weight of protein in the concentrated human milk fortifier. As discussed further below, in some embodiments of the present disclosure, the concentrated liquid human milk fortifiers of the present disclosure may optionally include other hypoallergenic or non-hypoallergenic proteins in addition to the extensively hydrolyzed casein protein.

Extensively hydrolyzed casein proteins suitable for use in the concentrated liquid human milk fortifiers of the present disclosure include those having a degree of hydrolysis of from about 10% to about 70%, including from about 30% to about 60%, and further including from about 40% to about 60%. Generally, the extensively hydrolyzed casein has a ratio of total amino nitrogen (AN) to total nitrogen (TN) of from about 0.2 AN to 1.0 TN to about 0.4 AN to about 0.8 TN. Suitable commercially available extensively hydrolyzed caseins will generally have a protein level in the ingredient of from about 50% to about 95%, including from about 70% to about 90%. One suitable commercially available extensively hydrolyzed casein is Dellac CE90, which is a spray dried powder casein hydrolysate (Friesland Campina Domo, Amersfoort, The Netherlands).

Stabilizer System

The concentrated liquid human milk fortifiers of the present disclosure include a synergistic two component stabilizer system. The first component is an octenyl succinic anhydride (OSA) modified starch, such as an octenyl succinic anhydride (OSA) modified corn starch. The second component is a low acyl gellan gum. These two components act in a synergistic manner to stabilize the concentrated liquid human milk fortifier emulsion and retard the precipitation of nutrients therefrom.

The OSA-modified starch, including the desirable OSA-modified corn starch, is generally prepared by esterifying a dextrinized, ungelatinized waxy corn starch with 1-octenyl succinic anhydride. Methods of this type are well known in the art. One suitable commercially available OSA-modified corn starch is N-CREAMER™ 46 (National Starch Food Innovation, Bridgewater, N.J.).

The OSA-modified starch is present in the concentrated liquid human milk fortifier in an amount of from about 0.1% to about 3.5%, including from about 0.6% to about 2.0%, including from about 0.8% to about 1.5%, and further including about 1.2% by weight of the concentrated liquid human milk fortifier.

The low acyl gellan gum (also known as and commonly referred to as deacylated gellan gum) may be a water-soluble polysaccharide produced by fermentation of a pure culture of *Sphingomonas elodea*. As used herein, "low acyl" means that the gellan gum has been treated such that it forms firm, non-elastic, brittle gels, that are heat stable, as compared to "high acyl" which forms soft, very elastic, non-brittle gels. One suitable commercially available low acyl gellan gum is Kelcogel F (CP Kelco U.S. Inc., Atlanta Ga.).

The low acyl gellan gum is present in the concentrated liquid human milk fortifier in an amount from greater than 125 ppm to about 800 ppm, including from about 150 ppm to about 400 ppm, including from about 200 ppm to about 300 ppm and further including about 200 ppm.

Macronutrients

The concentrated liquid human milk fortifiers of the present disclosure comprise carbohydrate, fat, and protein macronutrients of sufficient types and amounts, that when used in combination with human milk or other infant feeding formula, they help meet the nutritional needs of the infant, especially the premature infant. The concentration of these macronutrients in the various embodiments of the present disclosure includes the ranges described hereinafter.

Protein

The concentrated liquid human milk fortifiers of the present disclosure comprise a protein suitable for use in infants, especially preterm infants, at concentrations ranging from about 5% to about 50%, including from about 20% to about 40%, including from about 5% to about 30%, including from about 10% to about 25%, and also including from about 15% to about 25%, on a dry weight basis. In some embodiments, the protein may be at a concentration of less than 10%, on a dry weight basis. In some desirable embodiments, the protein concentration may be from about 7 to about 15 grams, including from about 9 to about 12 grams of protein per 100 grams of final liquid product.

As noted above, the protein component of the concentrated liquid human milk fortifiers of the present disclosure is at least partially comprised of extensively hydrolyzed casein. In a particularly desirable embodiment of the present disclosure, the protein component of the concentrated human milk fortifier is entirely comprised of extensively hydrolyzed casein. In embodiments wherein additional proteins sources (i.e., one or more protein sources in addition to the extensively hydrolyzed protein source) are to be used in the concentrated liquid human milk fortifier in addition to the extensively hydrolyzed casein (i.e., the concentrated human milk fortifier protein component is not 100% extensively hydrolyzed casein), the fortifier may still be made hypoallergenic by including additional hypoallergenic proteins such as soy protein hydrolysate, whey protein hydrolysate, rice protein hydrolysate, potato protein hydrolysate, fish protein hydrolysate, egg albumen hydrolysate, gelatin protein hydrolysate, pea protein hydrolysate, bean protein hydrolysate, combinations of animal and vegetable protein hydrolysates, and combinations thereof.

In this context, the terms "protein hydrolysates" or "hydrolyzed protein" are used interchangeably herein and include extensively hydrolyzed proteins, wherein the degree of hydrolysis is most often at least about 10%, including from about 10% to about 80%, and also including from about 30% to about 80%, even more preferably from about 40% to about 60%. The degree of hydrolysis is the extent to which peptide bonds are broken by a hydrolysis method. The degree of protein hydrolysis for purposes of characterizing the extensively hydrolyzed protein component of these embodiments is easily determined by one of ordinary skill in the formulation arts by quantifying the amino nitrogen to total nitrogen ratio (AN/TN) of the protein component of the selected formulation. The amino nitrogen component is quantified by USP titration methods for determining amino nitrogen content, while the total nitrogen component is determined by the Tecator Kjeldahl method, all of which are well known methods to one of ordinary skill in the analytical chemistry art.

In other embodiments of the present disclosure, the concentrated liquid human milk fortifier, in addition to the extensively hydrolyzed protein, may include an additional non-hypoallergenic protein source including for example, partially hydrolyzed or non-hydrolyzed (intact) protein, and can be derived from any known or otherwise suitable source such as milk (e.g., casein, whey, lactose-free milk protein isolates), animal (e.g., meat, fish), cereal (e.g., rice, corn), vegetable (e.g., soy, pea, bean), or combinations thereof. The protein can include, or be entirely or partially replaced by, free amino acids known or otherwise suitable for use in nutritional products, non-limiting examples of which include Non-limiting examples of free amino acids include L-alanine, L-arginine, L-asparagine, L-aspartic acid, L-carnitine, L-cystine, L-glutamic acid, L-glutamine, glycine, L-histidine, L-isoleucine, L-leucine, L-lysine, L-methionine, L-phenylalanine, L-proline, L-serine, L-taurine, L-threonine, L-tryptophan, L-tyrosine, L-valine, and combinations thereof.

Carbohydrate

The concentrated liquid human milk fortifiers of the present disclosure comprise a carbohydrate suitable for use in infants, especially preterm infants, at concentrations most typically ranging up to about 75% by weight on a dry weight basis, including from about 5% to about 50%, and also including from about 20% to about 40%, by weight on a dry weight basis.

Carbohydrates suitable for use in the concentrated liquid human milk fortifiers may include hydrolyzed or intact, naturally and/or chemically modified, starches sourced from corn, tapioca, rice or potato, in waxy or non-waxy forms. Other non-limiting examples of suitable carbohydrate sources include hydrolyzed cornstarch, maltodextrin (i.e. non-sweet, nutritive polysaccharide having a DE value less than 20), corn maltodextrin, glucose polymers, sucrose, corn syrup, corn syrup solids (i.e., polysaccharide having a DE value greater than 20), glucose, rice syrup, fructose, high fructose corn syrup, indigestible oligosaccharides such as fructooligosaccharides (FOS), and combinations thereof. The carbohydrates may comprise lactose or can be substantially free of lactose.

One embodiment of the present disclosure includes a non-reducing carbohydrate component, which may represent from about 10% to 100%, including from about 80% to 100%, and also including 100%, by weight of the total carbohydrate in the concentrated liquid human milk fortifier. The selection of a non-reducing carbohydrate may enhance the product stability and is generally better tolerated by infants, especially premature infants. Non-limiting examples of non-reducing carbohydrates include sucrose or other carbohydrates that do not readily oxidize or react with Tollen's, Benedict's, or Fehling's reagents. The present invention therefore includes those embodiments comprising a carbohydrate component, wherein the carbohydrate component comprises a mono- and/or disaccharide such that at least about 50%, including from about 80% to 100%, and also including 100%, of the mono- and/or disaccharide is a non-reducing carbohydrate.

Fat

The concentrated liquid human milk fortifiers of the present disclosure also comprise a fat component suitable for use in infants, especially preterm infants, at concentrations most typically ranging up to about 40% by weight on a dry weight basis, including from about 10% to about 40%, and also including from about 15% to about 37%, and also including from about 18% to about 30%, by weight on a dry weight basis.

Fats suitable for use in the concentrated liquid human milk fortifiers of the present disclosure may include coconut oil, soy oil, corn oil, olive oil, safflower oil, high oleic safflower oil, MCT oil (medium chain triglycerides), sunflower oil, high oleic sunflower oil, structured triglycerides, palm and palm kernel oils, palm olein, canola oil, marine oils, cottonseed oils, and combinations thereof.

Suitable fats for use in the concentrated liquid human milk fortifiers include emulsifiers to help the various fortifier components readily disperse when combined with human milk. Non-limiting examples of suitable emulsifiers include soya bean lecithin, polyoxythylene stearate, polyoxyethylene sorbitan mono-oleate, polyoxyethylene sorbitan monopalmitate, polyoxyethylene sorbitan monostearate, ammonium phosphatides, polyoxyethylene sorbitan monolaurate, citric acid esters of mono and diglycerides of fatty acids, tartaric acid esters of mono and diglycerides of fatty acids, and combinations thereof. Natural soy lecithin is especially useful in this respect.

The fat component of the concentrated liquid human milk fortifier may therefore optionally include any emulsifier suitable for use in infant nutritional products. Emulsifier concentrations in these products may range up to about 10%, including from about 1% to about 10%, even more typically from about 1.5% to about 5%, by weight of the total fat component.

Another aspect of the present disclosure includes those embodiments in which the weight ratio of fat to protein in the concentrated liquid human milk fortifier is at least about 0.3, including from about 0.4 to about 5, and also including from about 2 to about 4. These ratios may be helpful in further stabilizing the concentrated liquid human milk fortifier.

The concentrated liquid human milk fortifiers of the present disclosure also include those embodiments that comprise as part of the fat component one or more of arachidonic acid, docosahexaenoic acid, or combinations thereof, alone or in further combination with linoleic acid, linolenic acid, or both.

Vitamins and Minerals

The concentrated liquid human milk fortifiers of the present disclosure may further comprise any of a variety of vitamins, non-limiting examples of which include vitamin A, vitamin D, vitamin E, vitamin K, thiamine, riboflavin, pyridoxine, vitamin B12, niacin, folic acid, pantothenic acid, biotin, vitamin C, choline, inositol, salts and derivatives thereof, and combinations thereof.

The concentrated liquid human milk fortifiers may also further comprise any of a variety of minerals known or otherwise suitable for us in infant or other nutritional formulas, non-limiting examples of which include phosphorus, magnesium, calcium as described hereinbefore, zinc, manganese, copper, iodine, sodium, potassium, chloride, selenium, and combinations thereof.

The concentrated liquid human milk fortifiers of the present disclosure include those embodiments comprising per 100 kcal of fortifier solids one or more of the following: vitamin A (from about 250 to about 6500 IU), vitamin D (from about 40 to about 1200 IU), vitamin K, vitamin E (at least about 0.3 IU), vitamin C (at least about 8 mg), thiamine, vitamin B12, niacin, folic acid, pantothenic acid, biotin, choline (at least about 7 mg), and inositol (at least about 2 mg).

The concentrated liquid human milk fortifiers also include those embodiments comprising per 100 kcal of the fortifier solids one or more of the following: calcium (at least about 50 mg), phosphorus (at least about 25 mg), magnesium (at least about 6 mg), iodine, zinc (at least about 0.5 mg), copper, manganese, sodium (from about 20 to about 60 mg), potassium (from about 80 to about 200 mg), chloride (from about 55 to about 150 mg) and selenium (at least about 0.5 mcg).

Other Optional Ingredients

The concentrated liquid human milk fortifiers of the present disclosure may further optionally comprise other ingredients that may modify the physical, chemical, aesthetic or processing characteristics of the formulas or serve as pharmaceutical or additional nutritional components when used in the targeted population. Many such optional ingredients are known for use in food and nutritional products, including infant formulas, and may also be used in the concentrated liquid human milk fortifiers of the present disclosure, provided that such optional materials are compatible with the essential materials described herein, are safe and effective for their intended use, and do not otherwise unduly impair product performance.

Non-limiting examples of such optional ingredients include preservatives, anti-oxidants, various pharmaceuticals, buffers, carotenoids, colorants, flavors, nucleotides and nucleosides, thickening agents, prebiotics, probiotics, sialic acid-containing materials, and other excipients or processing aids.

Aseptic Packaging

The concentrated liquid human milk fortifiers of the present disclosure may be sterilized and aseptically packaged. The aseptic packaging can be accomplished using any of a variety of techniques well known to those of ordinary skill in the formulation art, so long as the heat treatment is sufficient to achieve long term shelf stability of the concentrated liquid. In one specific example, an aseptic process is utilized that includes a high temperature short time (HTST) processing step (i.e., about 74° C. for about 16 seconds) or an ultra high temperature (UHT) processing step (i.e., about 292° C. for about 5 seconds).

A typical aseptic process in accordance with the present disclosure involves the preparation of a slurry from one or more fluid combinations that may contain water and one or more of the following: carbohydrates, extensively hydrolyzed casein protein, fats, vitamins and minerals. This slurry is typically emulsified, deaerated, homogenized and cooled to form a sterilized formula, and then aseptically packaged to form a sterilized, aseptically packaged concentrated liquid human milk fortifier. Various other solutions may be added to the slurry at most any time before, during, or after processing.

Suitable aseptic packaging techniques include any of the well known aseptic packaging methods disclosed in the formulation arts for preparing nutritional formulation, all of which are generally directed to the sealing or filling of a sterilized liquid into a sterilized, air-tight container. Many variations on the basic method exist and are well known to those of ordinary skill in the formulation art, non-limiting examples of which are described in U.S. Pat. No. 6,096,358 (Murdick et al.); U.S. Pat. No. 6,227,261 (Das et al.); and U.S. Pat. No. 6,371,319 (Yeaton et al.), which descriptions are incorporated herein by reference.

The aseptically packaged embodiments of the present disclosure may include any container or package suitable for use with liquid human milk fortifiers and also capable of withstanding aseptic processing conditions (e.g., high temperature sterilization). Non-limiting examples of such containers include single or multi use bags, plastic bottles or containers, pouches, metal cans glass bottles, foil or other flexible pouches, syringes, vials, or any other container meeting the above-described criteria.

The aseptically packaged container for these embodiments is typically sterilized prior to being filled with its sterilized contents. The container is most typically sterilized by the application of hydrogen peroxide or other suitable disinfectant to the inside surface of the container. The hydrogen peroxide or other disinfectant is often applied in an atomized mist. After a disinfectant is applied, the container may be transported along a conveyor system during which time the container may be subjected to one or more sprayings of hot sterilized air, preferably hot, sterilized, dry air. The container is then preferably injected with nitrogen gas. The aseptically prepared container is then aseptically filled with sterilized product and sealed.

For aseptic packaging, the concentrated liquid human milk fortifier is typically heat treated with a high temperature short time (HTST) process or an ultra high temperature (UHT) process to sufficiently reduce the bioburden to allow the products to maintain commercially sterile over an extended shelf-life of the finished product exceeding about 12 months. The treated formula is then homogenized at 1000 psi or higher and aseptically packaged.

In an alternative embodiment, the concentrated human milk fortifiers of the present disclosure may also be sterilized and retort packaged utilizing conventional means known in the art.

Method of Use

The concentrated liquid human milk fortifier of the present disclosure is used in combination with human milk or other suitable infant formula, wherein the resulting fortified human milk or fortified infant formula has an osmolality suitable for oral administration to an infant. As noted, the osmolality will most typically be less than about 500 mOsm/kg water, more typically from about 300 mOsm/kg water to about 400 mOsm/kg water.

The concentrated liquid human milk fortifier of the present disclosure may be added directly to human milk in a volume to volume ratio of from about 1:3 to about 1:9, including from about 1:3.5 to about 1:7, and also including from about 1:4 to about 1:6. The ratio is ultimately selected based primarily upon the ingredients and osmolality of the concentrated liquid human milk fortifier and in view of the particular nutritional needs of the infant. The concentrated liquid human milk fortifier may be added directly to every feeding or to a sufficient number of feedings (e.g., once or twice daily) to provide optimal nutrition in view of the particular nutritional needs of the infant.

Human milk or other infant formula, after fortification with the concentrated liquid human milk fortifier will most typically have a caloric density ranging from about 19 kcal/fl oz (0.64 kcal/ml) to about 26.7 kcal/fl oz (0.9 kcal/ml), with the 22-25 kcal/fl oz formulations (0.74-0.84 kcal/ml) being more useful in preterm infants, and the 19-21 kcal/fl oz (0.64-0.71 kcal/ml) formulations more useful for term infants.

The methods of the present disclosure therefore include a method of providing nutrition to infants, especially preterm infants, said method comprising the addition of the concentrated liquid human milk fortifier to human milk or other infant feeding composition, followed by the administration of the fortified human milk or feeding composition to the infant.

The methods of the present disclosure also include a method of reducing the risk of microbial contamination, including *Cronobacter* (*Enterobacter*) *sakazakii* contamination, of term or preterm infant feeding compositions, said method comprising the direct addition of the concentrated liquid human milk fortifier to human milk or other infant feeding composition followed by the administration of the fortified composition to the infant.

Manufacture

The concentrated liquid human milk fortifiers of the present disclosure may be prepared in accordance with the methods described hereinafter, which methods are described in association with the exemplified embodiments (see Examples).

In one embodiment, the concentrated liquid human milk fortifier is prepared by solubilizing and combining/mixing ingredients into a homogeneous aqueous mixture which is subjected to a sufficient thermal treatment and aseptic filling to achieve long term physical and microbial shelf stability.

To begin the manufacturing process, macronutrients (carbohydrate, protein, fat, and minerals) are combined in several slurries together and with water. This blend is subjected to an initial heat treatment and then tested to verify proper nutrient levels. Additional detail on this process is provided in the following paragraphs.

An intermediate aqueous carbohydrate-mineral (CHO-MN) slurry is prepared by heating appropriate amount of water. With agitation, the following soluble ingredients are added: maltodextrin, potassium citrate, magnesium chloride, potassium chloride, sodium chloride, and choline chloride. The carbohydrate-mineral slurry is held at elevated temperature under agitation until added to the blend.

An intermediate oil slurry is prepared by heating MCT oil and coconut oil to an elevated temperature and then adding distilled monoglycerides with agitation for minimum 10 minutes in order to the ingredient to dissolve. Soy oil, vitamin A palmitate, vitamin D3, di-alpha-tocopheryl-acetate, phylloquinone, ARA, DHA, and mixed carotenoids are then added with agitation to the oil blend. Insoluble mineral calcium source, ultra micronized tricalcium phosphate, is added to the oil. Gellan gum and OSA-modified starch are then added to the oil blend with proper agitation. The oil blend slurry is maintained at an elevated temperature under agitation until added to the blend.

The blend is prepared by combining the ingredient water, casein hydrolysate, all of the CHO-MIN slurry and whole oil blend slurry. The blend is maintained at 120° F. for a period of time not to exceed two hours before further processing.

The blend is then homogenized using one or more in-line homogenizers at pressures from 1000-4000 psig with or without a second stage homogenization from 100-500 psig followed by heat treatment using a UHTST (ultra-high temperature short time, 292-297° F. for 1-30 seconds) process. After the appropriate heat treatment, the batch is cooled in a plate cooler to 33-45° F. and then transferred to a refrigerated holding tank, where it is subjected to analytical testing.

The next step in the manufacturing process involves adding vitamins, trace minerals and water in order to reach the final target total solids and vitamin/mineral contents. The final batch is filled into a suitable container under aseptic conditions or treated with a terminal sterilization process so the product will be stable at room temperature for an extended shelf-life. Additional detail on this process is provided in the following paragraphs.

A trace mineral/vitamin/nutrient solution (STD1) is prepared by heating water to 80-100° F. and adding the following ingredients with agitation: potassium citrate, ferrous sulfate, zinc sulfate, copper sulfate, manganese sulfate, sodium selenate, pyridoxine hydrochloride, riboflavin, thiamine hydrochloride, cyanocobalamin, folic acid, calcium pantothenate, niacinamide, biotin, m-inositol, nucleotide/choline premix, L-carnitine, L-Leucine, and L-tyrosine.

A vitamin C solution (STD2) is prepared by adding ascorbic acid to water solution with agitation.

All STD1 and STD2 solutions are then added to the refrigerated batch, with agitation. The appropriate amount of ingredient dilution water is then added to the batch to achieve a target total solids level of 28.0-32.0%. The final batch is then subjected to appropriate thermal treatment and filled into a suitable container under an aseptic conditions and processes.

The concentrated liquid human milk fortifiers of the present disclosure may, of course, be manufactured by other known or otherwise suitable techniques not specifically described or shown herein without departing from the spirit and scope of the present disclosure. The present embodiments are, therefore, to be considered in all respects as illustrative and not restrictive and that all changes and equivalents also come within the description of the present disclosure. The following non-limiting examples will further illustrate the formulations and methods of the present disclosure.

EXAMPLES

The following examples illustrate specific embodiments and/or features of the concentrated liquid human milk fortifiers products of the present disclosure. The examples are given solely for the purpose of illustration and are not to be construed as limitations of the present disclosure, as many variations thereof are possible without departing from the spirit and scope of the disclosure. All exemplified amounts are weight percentages based upon the total weight of the formulation, unless otherwise specified.

Examples 1-4

In Examples 1-4, concentrated liquid human milk fortifiers are prepared in accordance with the present disclosure. The ingredients for the concentrated liquid human milk fortifier are shown in the following table.

| Ingredient (Per 1000 Kg) | Example 1 | Example 2 | Example 3 | Example 4 |
|---|---|---|---|---|
| Water | Q.S. | Q.S. | Q.S. | Q.S. |
| Casein Hydrolysate | 108 Kg | 108 Kg | 125 Kg | 150 Kg |
| Maltodextrin | 104 Kg | 104 Kg | 104 Kg | 104 Kg |
| MCT Oil | 17.3 Kg | 17.3 Kg | 17.3 Kg | 17.3 Kg |
| Tricalcium Phosphate | 16.0 Kg | 16.0 Kg | 16.0 Kg | 16.0 Kg |
| Soy Oil | 10.4 Kg | 10.4 Kg | 10.4 Kg | 10.4 Kg |
| OSA-Modified Starch | 12.0 Kg | 10.0 Kg | 35.0 Kg | 6.0 Kg |
| Coconut Oil | 6.3 Kg | 6.3 Kg | 6.3 Kg | 6.3 Kg |
| Potassium Citrate | 6.9 Kg | 6.9 Kg | 6.9 Kg | 6.9 Kg |
| Ascorbic Acid | 2.9 Kg | 2.9 Kg | 2.9 Kg | 2.9 Kg |
| Magnesium Chloride | 4.0 Kg | 4.0 Kg | 4.0 Kg | 4.0 Kg |
| *M. Alpina* Oil (ARA) | 2.6 Kg | 2.6 Kg | 2.6 Kg | 2.6 Kg |
| Leucine | 1.8 Kg | 1.8 Kg | 1.8 Kg | 1.8 Kg |
| *C. Cohnii* Oil (DHA) | 2.1 Kg | 2.1 Kg | 2.1 Kg | 2.1 Kg |
| Potassium Chloride | 1.1 Kg | 1.1 Kg | 1.1 Kg | 1.1 Kg |
| Tyrosine | 1.4 Kg | 1.4 Kg | 1.4 Kg | 1.4 Kg |
| Distilled Monoglycerides | 800 g | 800 g | 800 g | 800 g |
| Mixed Carotenoid Premix | 551 g | 551 g | 551 g | 551 g |
| M-Inositol | 529 g | 529 g | 529 g | 529 g |
| Sodium Chloride | 861 g | 861 g | 861 g | 861 g |
| L-Carnitine | 221 g | 221 g | 221 g | 221 g |
| Tryptophan | 331 g | 331 g | 331 g | 331 g |
| Zinc Sulfate | 309 g | 309 g | 309 g | 309 g |
| Niacinamide | 320 g | 320 g | 320 g | 320 g |
| dl-Alpha-Tocopheryl Acetate | 364 g | 364 g | 364 g | 364 g |
| Gellan Gum | 200 g | 300 g | 400 g | 600 g |
| Ferrous Sulfate | 106 g | 106 g | 106 g | 106 g |
| Choline Chloride | 353 g | 353 g | 353 g | 353 g |
| Calcium Pantothenate | 132 g | 132 g | 132 g | 132 g |
| Vitamin A Palmitate | 77 g | 77 g | 77 g | 77 g |
| Riboflavin | 33 g | 33 g | 33 g | 33 g |
| Vitamin D3 | 13 g | 13 g | 13 g | 13 g |
| Copper Sulfate | 18 g | 18 g | 18 g | 18 g |
| Pyridoxine Hydrochloride | 20 g | 20 g | 20 g | 20 g |
| Thiamin Hydrochloride | 24 g | 24 g | 24 g | 24 g |
| Folic Acid | 3.3 g | 3.3 g | 3.3 g | 3.3 g |
| Biotin | 2.5 g | 2.5 g | 2.5 g | 2.5 g |
| Manganese Sulfate | 1.8 g | 1.8 g | 1.8 g | 1.8 g |
| Phylloquinone | 880 mg | 880 mg | 880 mg | 880 mg |
| Sodium Selenate | 90 mg | 90 mg | 90 mg | 90 mg |
| Cyanocobalamin | 88 mg | 88 mg | 88 mg | 88 mg |
| Potassium Hydroxide | q.s. | q.s. | q.s. | q.s. |

The concentrated liquid human milk fortifier is prepared by solubilizing and combining/mixing ingredients into a homogeneous aqueous mixture which is subjected to a sufficient thermal treatment and aseptic filling to achieve long term physical and microbial shelf stability.

To begin the manufacturing process, macronutrients (carbohydrate, protein, fat, and minerals) are combined in several slurries together and with water. This blend is subjected to an initial heat treatment and then tested to verify proper nutrient levels. Additional detail on this process is provided in the following paragraphs.

An intermediate aqueous carbohydrate-mineral (CHO-MN) slurry is prepared by heating appropriate amount of water to 140-160° F. With agitation, the following soluble ingredients are added: maltodextrin, potassium citrate, magnesium chloride, potassium chloride, sodium chloride, and choline chloride. The carbohydrate-mineral slurry is held at 130-150° F. under agitation until added to the blend.

An intermediate oil slurry is prepared by heating MCT oil and coconut oil to 150 to 170° C. and then adding distilled monoglycerides with agitation for a minimum of 10 minutes in order to the ingredient to dissolve. Soy oil, vitamin A palmitate, vitamin D3, di-alpha-tocopheryl-acetate, phylloquinone, ARA-containing oil, DHA-containing oil, and carotenoid premix are then added with agitation to the oil blend. Insoluble mineral calcium source, and ultra micronized tricalcium phosphate is added to the oil. Gellan gum and OSA-modified starch are then added to the oil blend with proper agitation. The oil blend slurry is maintained at 130-150° F. under agitation until added to the blend.

The blend is prepared by combining the ingredient water, casein hydrolysate, all of the CHO-MIN slurry and whole oil blend slurry. The blend is maintained at 120° F. for a period of time not to exceed two hours before further processing.

The blend is then homogenized using one or more in-line homogenizers at pressures from 1000-4000 psig with or without a second stage homogenization from 100-500 psig followed by heat treatment using a UHTST (ultra-high temperature short time, 292-297° F. for 5-15 seconds) process. After the appropriate heat treatment, the batch is cooled in a plate cooler to 33-45° F. and then transferred to a refrigerated holding tank, where it is subjected to analytical testing.

The next step in the manufacturing process involves adding vitamins, trace minerals, other ingredients, and water in order to reach the final target total solids and vitamin/mineral contents. The final batch is filled into a suitable container under aseptic conditions or treated with a terminal sterilization process so the product will be stable at room temperature for an extended shelf-life. Additional detail on this process is provided in the following paragraphs.

A trace mineral/vitamin/nutrient solution (STD1) is prepared by heating water to 80-100° F. and adding the following ingredients with agitation: potassium citrate, ferrous sulfate, zinc sulfate, copper sulfate, manganese sulfate, sodium selenate, pyridoxine hydrochloride, riboflavin, thiamine hydrochloride, cyanocobalamin, folic acid, calcium pantothenate, niacinamide, biotin, m-inositol, nucleotide/choline premix, L-carnitine, L-Leucine, and L-tyrosine.

A vitamin C solution (STD2) is prepared by adding ascorbic acid to a water solution with agitation.

All STD1 and STD2 solutions are then added to the refrigerated batch, with agitation. The appropriate amount of ingredient dilution water is then added to the batch to achieve a target total solids level of 29.0-32.0%. The final batch is then subjected to appropriate thermal treatment and filled into a suitable container under an aseptic conditions and processes.

Example 5

In this Example, four separate concentrated liquid human milk fortifiers were prepared and the overall stability in terms of amount of phase separation (emulsion stability), sediment at the bottom of the container, and creaming at the top of the liquid, of each was evaluated at 24 hours after manufacture. Each of the four tested concentrated liquid human milk fortifiers were based on the concentrated liquid human milk fortifier of Example 2.

The first concentrated liquid human milk fortifier was identical to that of Example 2 except that it did not contain any OSA-modified corn starch and did not contain any low acyl gellan gum. The second fortifier was identical to that of Example 2 except that it did not contain any low acyl gellan gum. The third fortifier was identical to that of Example 2 except that it did not contain any OSA-modified corn starch. The fourth fortifier was identical to that of Example 2. Each of the four fortifiers was prepared in accordance with the manufacturing process of Examples 1-4.

Upon evaluation, the first fortifier (no OSA-modified corn starch and no low acyl gellan gum) showed nearly complete phase separation of the oil and water phases, and showed both heavy creaming at the top of the liquid and heavy sediment at the bottom of the container. (See FIG. 1).

Figure 2:
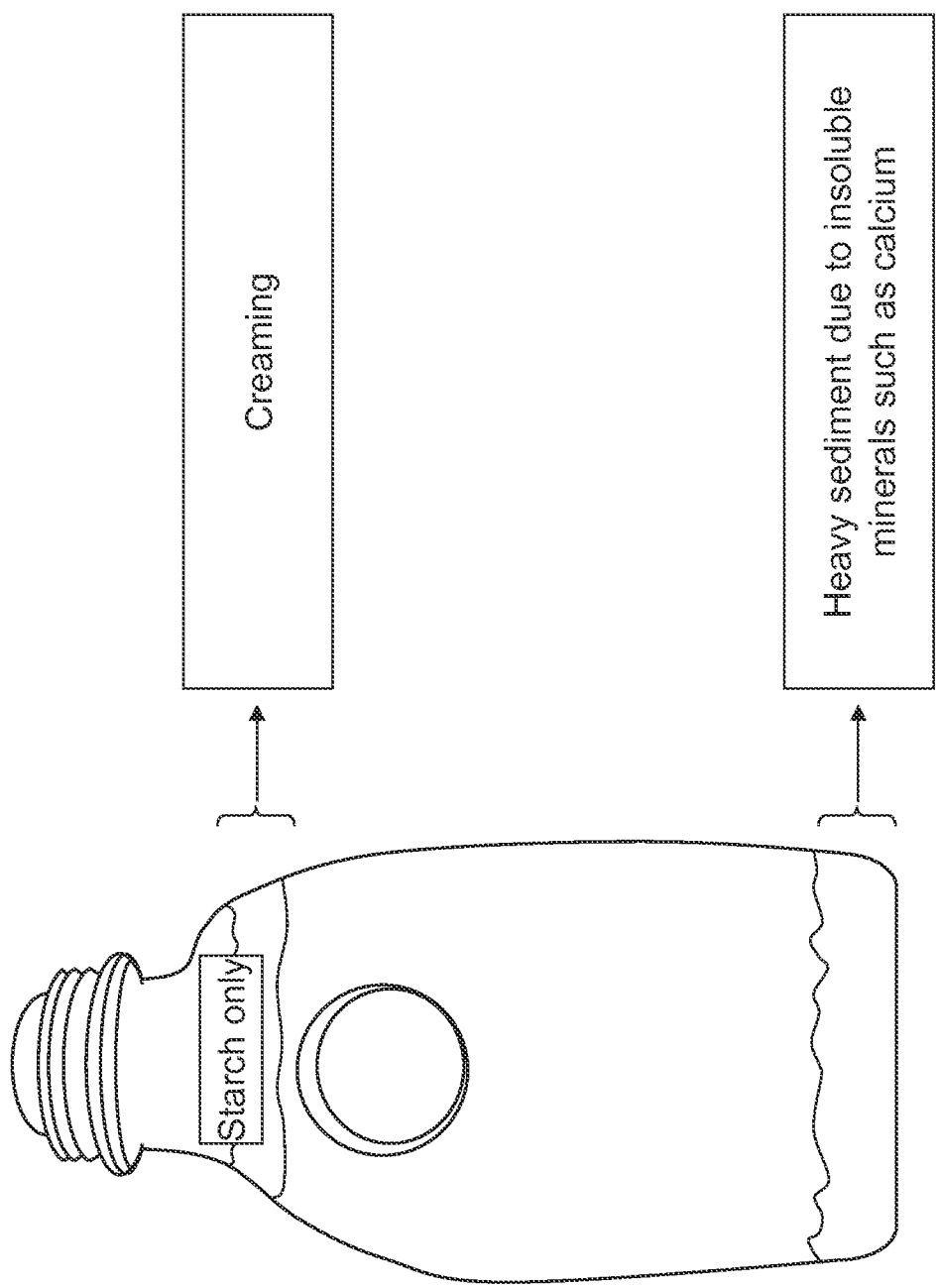
FIG. 2 is a photograph of a plastic container including a concentrated liquid human milk fortifier that contains OSA-modified corn starch but does not contain low acyl gellan gum.

Upon evaluation, the second fortifier (no low acyl gellan gum) showed both heavy creaming at the top of the liquid and heavy sediment at the bottom of the container. (See FIG. 2).

Figure 3:
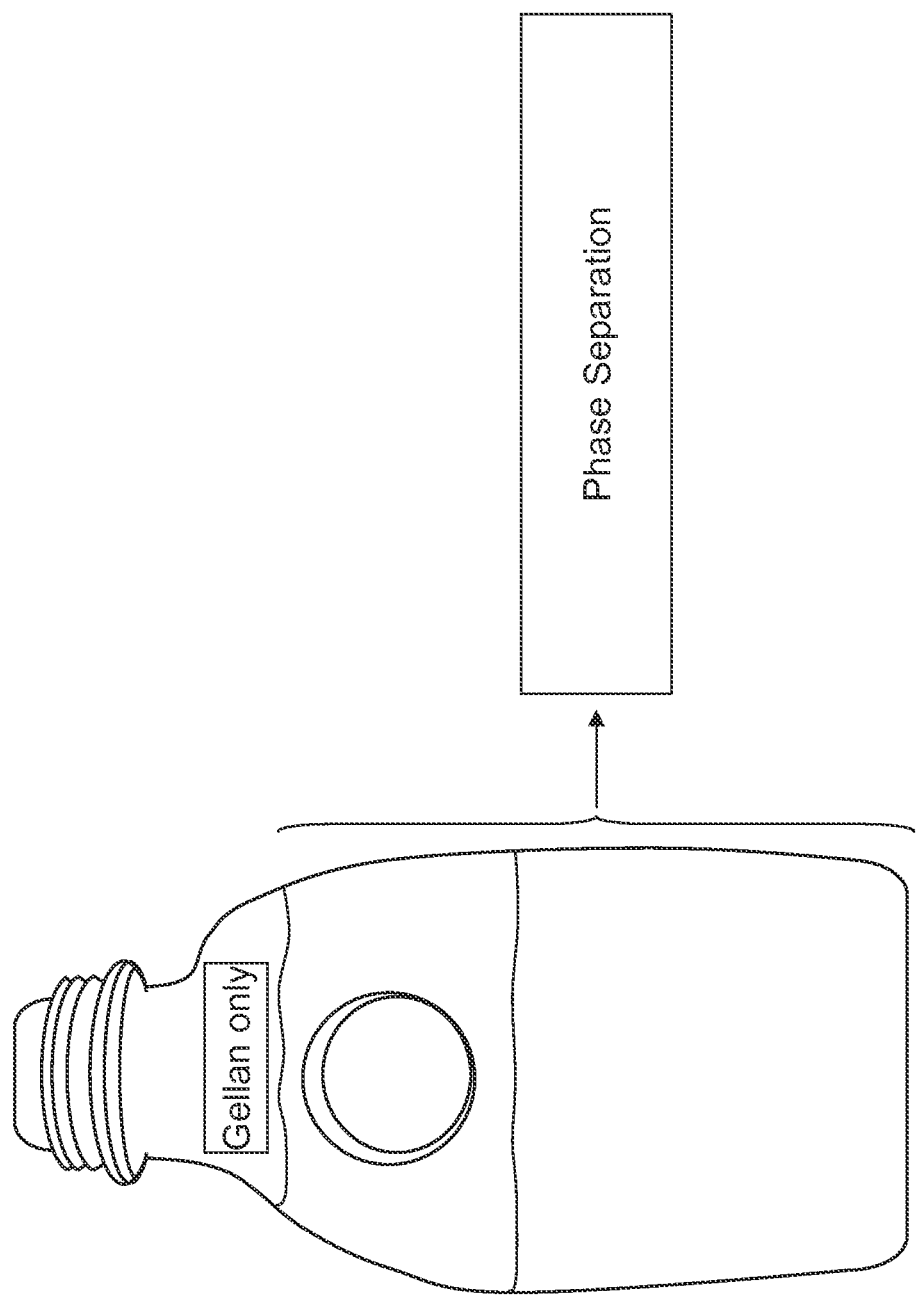
FIG. 3 is a photograph of a plastic container including a concentrated liquid human milk fortifier that contains low acyl gellan gum but does not contain OSA-modified corn starch.

Upon evaluation, the third fortifier (no OSA-modified corn starch) showed nearly complete phase separation of the oil phase and the water phase. (See FIG. 3).

Figure 4:
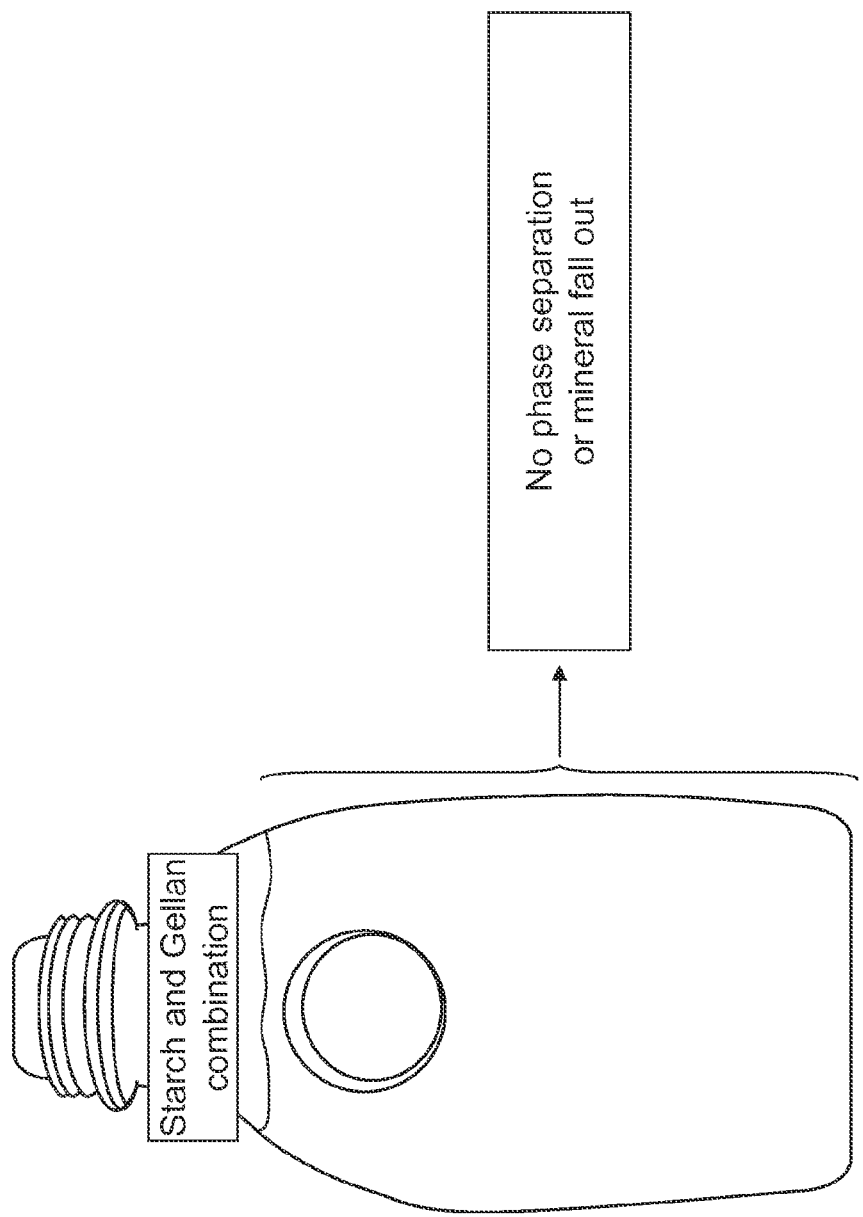
FIG. 4 is a photograph of a plastic container including a concentrated liquid human milk fortifier that contains both OSA-modified corn starch and low acyl gellan gum.

Upon evaluation, the fourth fortifier (containing both OSA-modified corn starch and low acyl gellan gum) showed no phase separation, no creaming, and no sediment. (See FIG. 4). The stabilizing system of a combination of OSA-modified corn starch and low acyl gellan gum showed a synergistic interaction and allowed for the manufacture of physically stable concentrated liquid human milk fortifier containing extensively hydrolyzed casein and a high level of insoluble calcium salts without causing defects in emulsion stability and sediment fall out.

Example 6

In this Example rheological measurements were conducted on the four liquid human milk fortifiers of Example 5 to evaluate the macro-measurements that describe the bulk characteristics of the liquids. The measurements were done to elucidate emulsion and suspension characteristics of each liquid formulation. The measurements were made on an ARES G2 Rheometer (TA Instruments, New Castle, Del.) at a strain sweep frequency of 10 rad/s.

Figure 5:
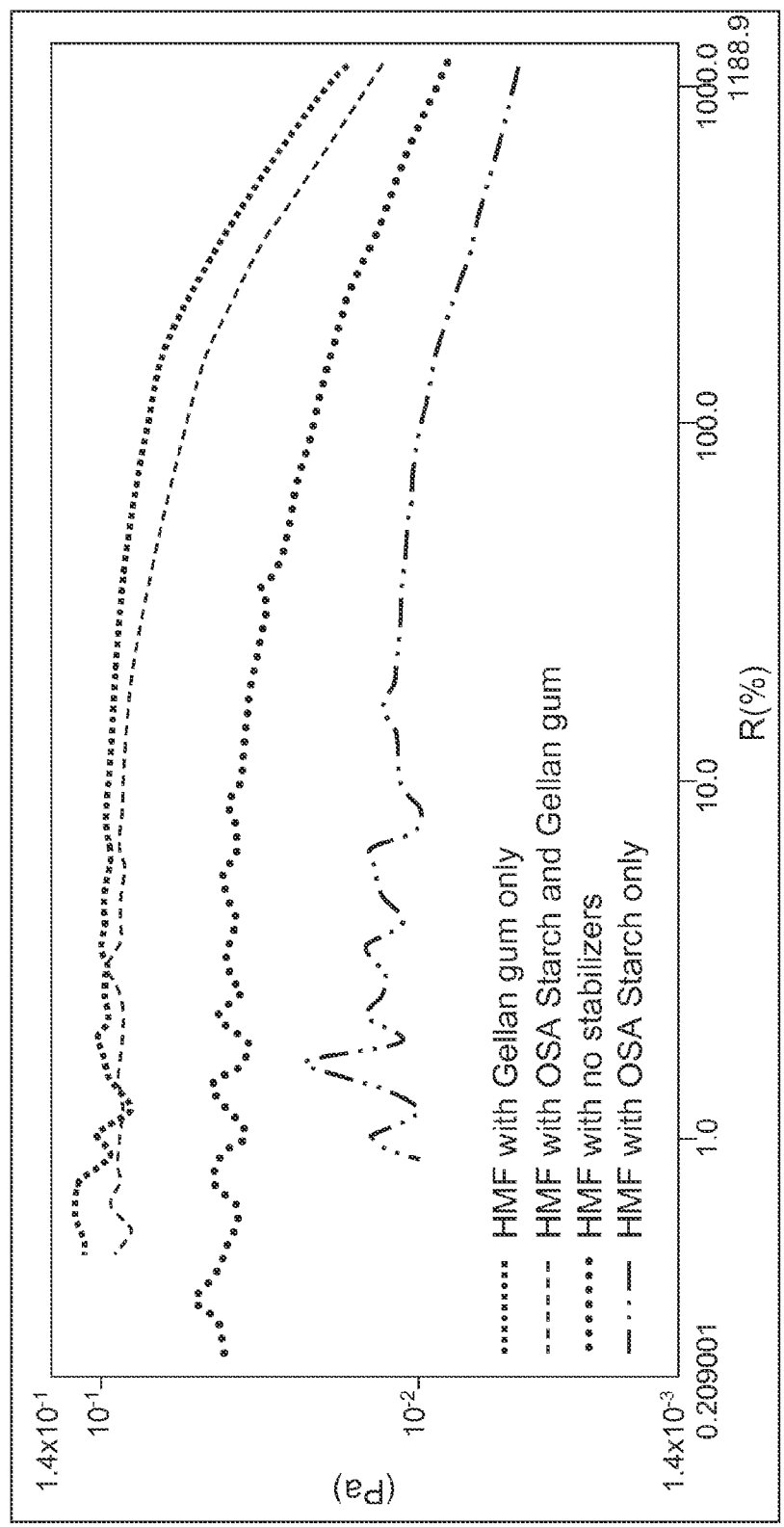
FIG. 5 is a graph showing the elastic modula of various liquid human milk fortifier samples as a function of strain.

FIG. 5 compares the elastic modula of the four concentrated liquid human milk fortifier samples as a function of strain. As the data indicate, the most stable fortifier is the fortifier including the OSA-modified starch and low acyl gellan gum. This fortifier demonstrates a substantial linear range with no instabilities, thus indicating stable emulsion and suspension characteristics. The fortifier including low acyl gellan gum only shows a break in the structure and distinctly different linear ranges at low strain, which is representative of a phase separation. The formulation containing OSA-modified starch only also shows instabilities at low strains and very low elastic modula associated with a very small linear range thus revealing poor emulsion and suspension characteristics. The formulation without either low acyl gellan gum or OSA-modified starch also shows instabilities at low strains with very minimal linear range, which is a sign of poor emulsion and suspension characteristics.

Example 7

In this Example, particle size distributions of two concentrated liquid human milk fortifiers including different amounts of stabilizers were analyzed using a LS 13 320 Laser Diffraction Particle Size Analyzer (Beckman Coulter, Inc., Brea, Calif.).

The first concentrated liquid human milk fortifier was identical to Example 2 above and the second was identical to Example 2 with the exception that the low acyl gellan gum was present in an amount of 125 ppm (low level) instead of 300 ppm (high level).

Figure 6:
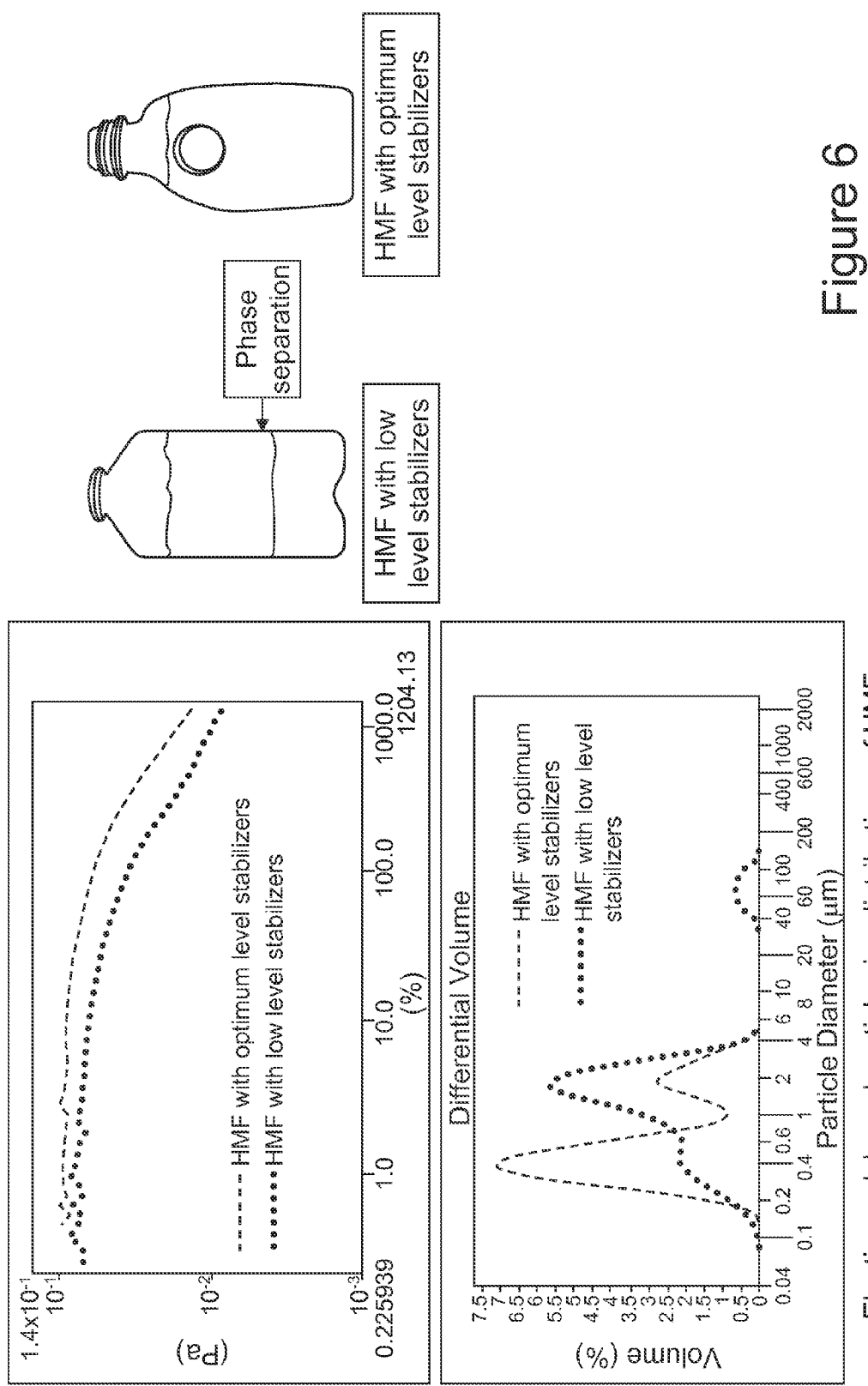
FIG. 6 shows two graphs indicating elastic modula and particle size distribution of two concentrated liquid human milk fortifiers with varying levels of stabilizers.

FIG. 6 shows that the concentrated liquid human milk fortifier including low acyl gellan gum at the 125 ppm level has instabilities in the linear range at low strains indicating phase separations. Also, the linear range is much shorter as compared to the concentrated liquid human milk fortifier including low acyl gellan gum at the 300 ppm level. FIG. 6 also shows that the concentrated human milk fortifier including the 300 ppm low acyl gellan gum demonstrated a very long linear range with no instabilities indicating good emulsion and suspension stabilities. Additionally, the particle size distribution analyses of the two samples also indicates differences in the emulsion and suspension stabilities (particle size distributions obtained using LS 13 320 laser diffraction particle size analyzer (Beckman, Coulter, Inc.)).

Example 8

Figure 7:
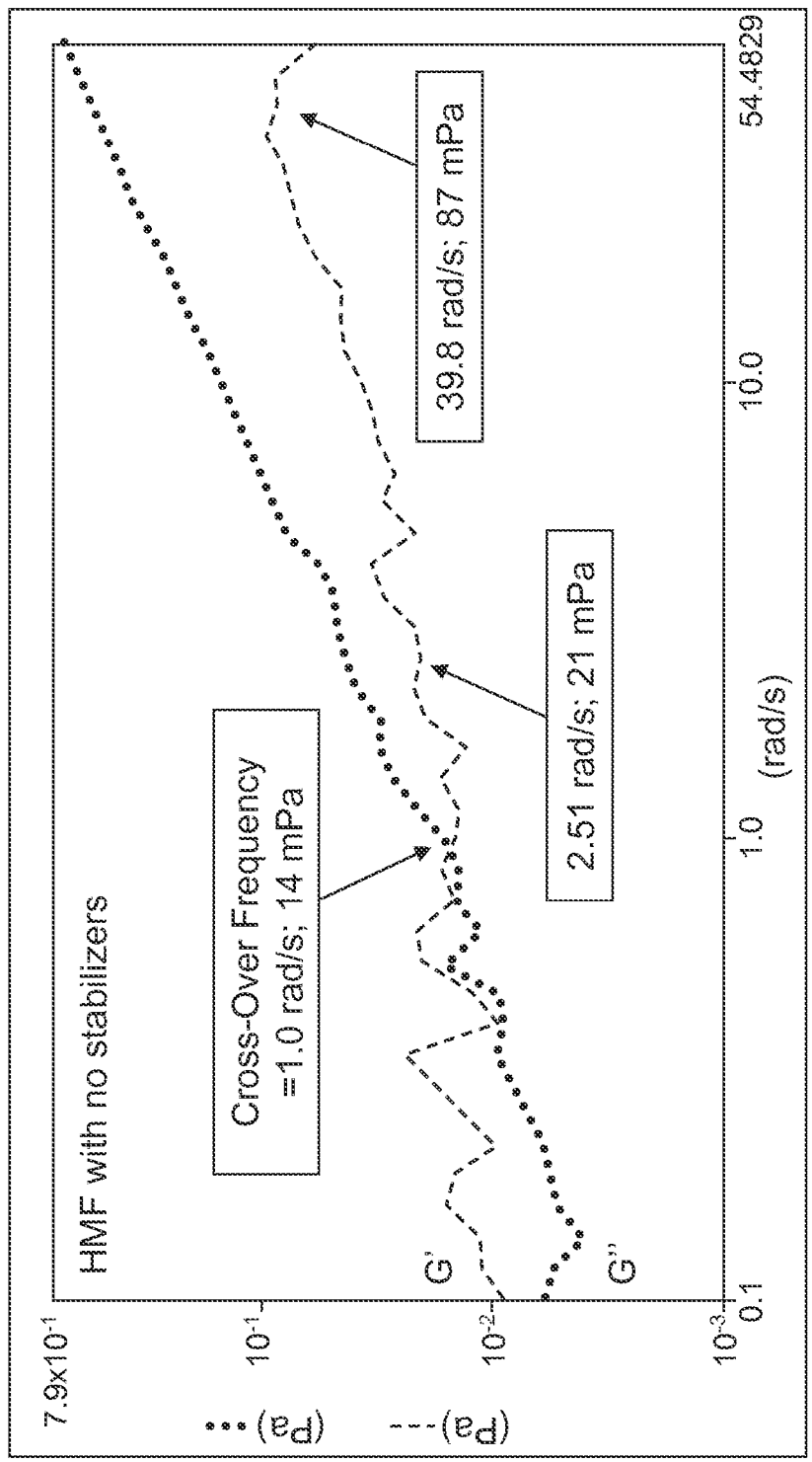
FIG. 7 is a graph showing dynamic modula of a liquid human milk fortifier in the absence of OSA-modified starch and low acyl gellan gum as a function of frequency.

In this Example, the four fortifiers of Example 5 were analyzed for dynamic modula measured as a function of frequency and temperature conducted in the linear range to represent the equilibrium of the samples. Referring now to FIG. 7, the mechanical spectra for the fortifier without OSA-modified starch and low acyl gellan gum show a cross over modula at a frequency of 1 rad/s, indicating that this fortifier is like a viscoelastic gel, which can result in phase separations. This fortifier's strain sweep spectra also showed instabilities at low strains with very small linear range, thus further confirming a lack of an emulsion and suspension stability.

Figure 8:
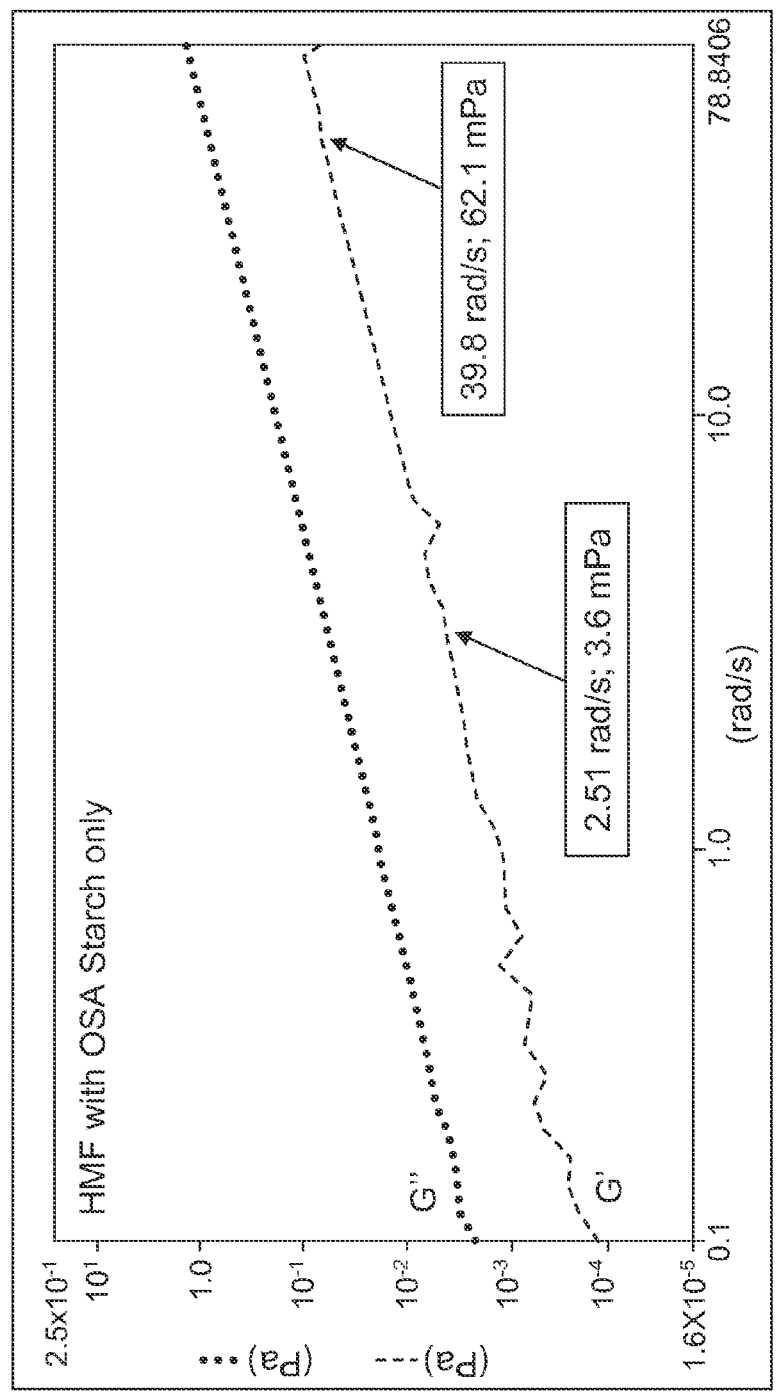
FIG. 8 is a graph showing the dynamic modula of a liquid human milk fortifier containing OSA-modified starch as a function of frequency.
Figure 9:
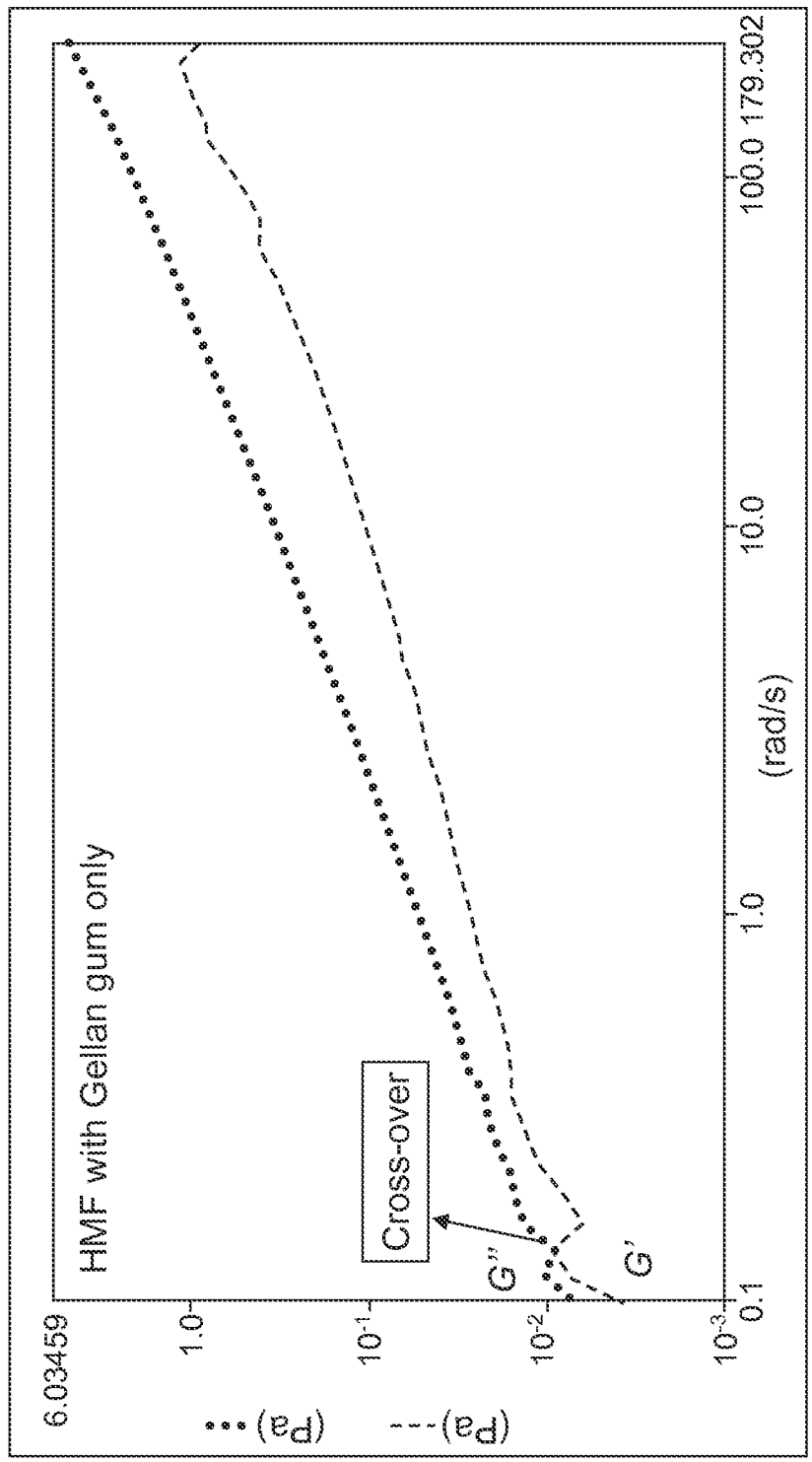
FIG. 9 is a graph showing the dynamic modula of a liquid human milk fortifier containing low acyl gellan gum as a function of frequency.
Figure 10:
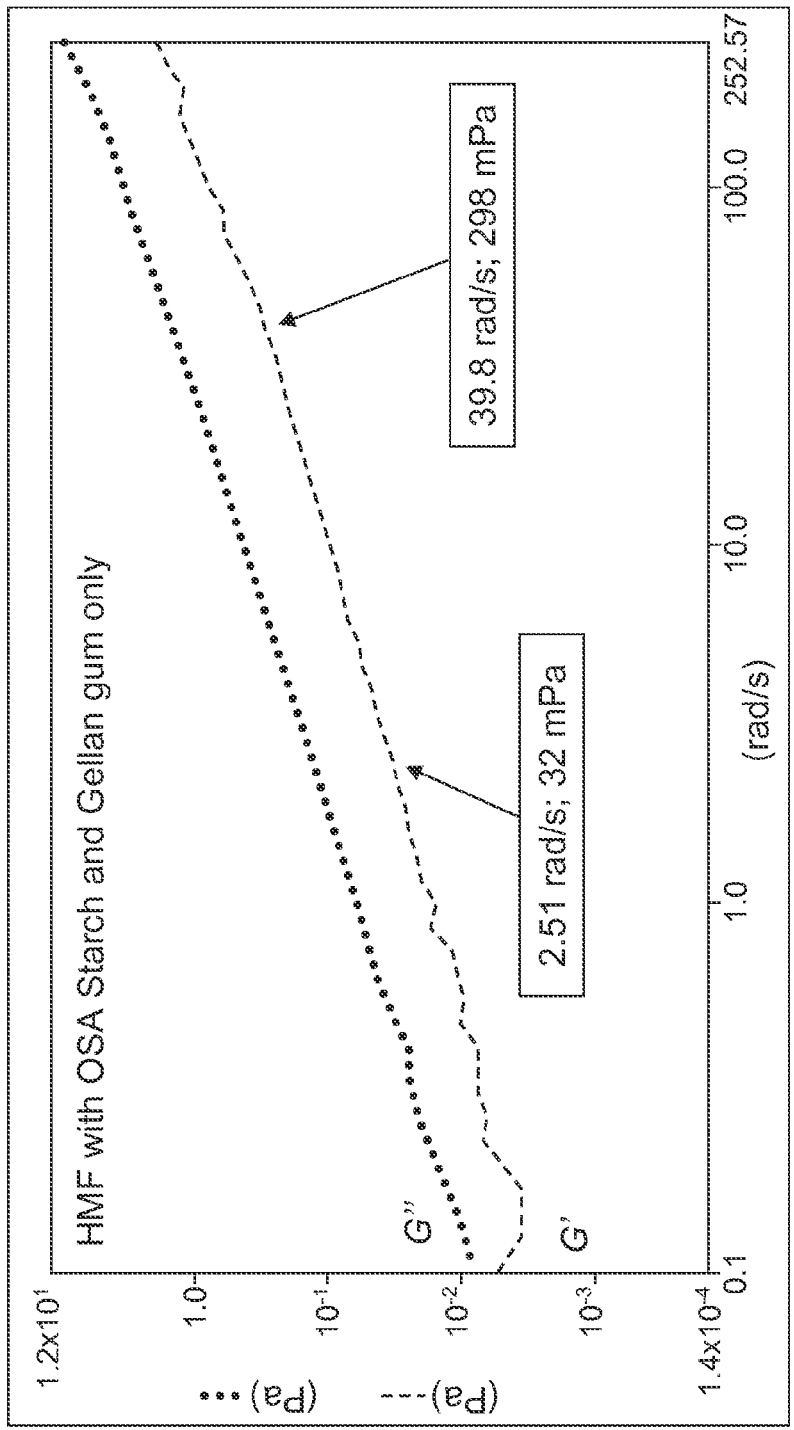
FIG. 10 is a graph showing the dynamic modula of a liquid human milk fortifier containing OSA-modified starch and low acyl gellan gum as a function of frequency.

Referring now to FIG. 8, the mechanical spectra for the fortifier with OSA-modified starch only show a very low elastic modula indicating very poor suspension stability. Referring now to FIG. 9, the mechanical spectra for the fortifier with low acyl gellan gum only show a possible cross over at low frequencies which results in phase separations. Referring now to FIG. 10, the mechanical spectra for the fortifier with both OSA-modified starch and low acyl gellan gum show that the fortifier is a viscoelastic liquid such that no gel-like activity is expected. Additionally, the low frequency elastic modula is significantly larger than the other fortifiers with no defects showing enhanced suspension stability. Also, the high frequency elastic modula is significantly larger than the other fortifiers with no defects proving good emulsion characteristics.

As the data and Figures indicate, the sample including the OSA starch and gellan gum was the most stable and had the best suspension characteristics. The OSA starch and gellan gum appear to act synergistically together to provide a significantly improved product.

What is claimed is:

1. A concentrated liquid human milk fortifier comprising from about 5% to about 50% by weight protein, on a dry weight basis, wherein the concentrated liquid human milk fortifier comprises a stabilizer system comprising an octenyl succinic anhydride modified corn starch and a low acyl gellan gum, and at least a portion of the protein is extensively hydrolyzed casein, and wherein the concentrated liquid human milk fortifier has a caloric density of 1.25 kcal/ml to 5 kcal/ml.

2. The concentrated liquid human milk fortifier of claim 1 comprising from about 20% to about 40% by weight protein, on a dry weight basis.

3. The concentrated liquid human milk fortifier of claim 1 wherein the protein is 100% by weight total protein component, extensively hydrolyzed casein.

4. The concentrated liquid human milk fortifier of claim 1 wherein the octenyl succinic anhydride modified corn starch is present in an amount of from about 0.6% to about 2.0% by weight of the concentrated liquid human milk fortifier.

5. The concentrated liquid human milk fortifier of claim 1 wherein the octenyl succinic anhydride modified corn starch is present in an amount of from about 0.8% to about 1.5% by weight of the concentrated liquid human milk fortifier.

6. The concentrated liquid human milk fortifier of claim 1 wherein the low acyl gellan gum is present in an amount of from greater than 125 to about 800 ppm.

7. The concentrated liquid human milk fortifier of claim 1 wherein the low acyl gellan gum is present in an amount of from about 150 ppm to about 400 ppm.

8. The concentrated liquid human milk fortifier of claim 1 further including carbohydrate, fat, vitamins and minerals.

9. The concentrated liquid human milk fortifier of claim 1 wherein the protein is hypoallergenic protein.

10. The concentrated liquid human milk fortifier of claim 1 wherein the concentrated liquid human milk fortifier is carrageenan-free.

11. A concentrated liquid human milk fortifier comprising from about 10% to about 50% by weight extensively hydrolyzed casein protein, on a dry weight basis, wherein the concentrated liquid human milk fortifier comprises a stabilizer system comprising from about 0.6% to about 2.0% by weight of an octenyl succinic anhydride modified corn starch and from about 125 to about 800 ppm low acyl gellan gum, and wherein the concentrated liquid human milk fortifier has a caloric density of 1.25 kcal/ml to 5 kcal/ml.

12. The concentrated liquid human milk fortifier of claim 11 comprising from about 20% to about 40% by weight extensively hydrolyzed casein protein.

13. The concentrated liquid human milk fortifier of claim 11 comprising from about 0.8% to about 1.5% by weight of an octenyl succinic anhydride modified corn starch.

14. The concentrated liquid human milk fortifier of claim 11 comprising from about 150 to about 400 ppm low acyl gellan gum.

15. An aseptically-sterilized concentrated liquid human milk fortifier comprising from about 10% to about 50% by weight extensively hydrolyzed casein protein, on a dry weight basis, wherein the concentrated liquid human milk fortifier comprises a stabilizer system comprising from about 0.6% to about 2.0% by weight of an octenyl succinic anhydride modified corn starch and from about 125 to about 800 ppm low acyl gellan gum, and wherein the concentrated liquid human milk fortifier has a caloric density of 1.25 kcal/ml to 5 kcal/ml.

16. The concentrated liquid human milk fortifier of claim 1, wherein at least 75% by weight of the protein is extensively hydrolyzed casein, and wherein the concentrated liquid human milk fortifier has a caloric density of 1.4 kcal/ml to 5 kcal/ml.

17. The concentrated liquid human milk fortifier of claim 11, wherein the concentrated liquid human milk fortifier has a caloric density of 1.4 kcal/ml to 5 kcal/ml.

18. The concentrated liquid human milk fortifier of claim 15, wherein the concentrated liquid human milk fortifier has a caloric density of 1.4 kcal/ml to 5 kcal/ml.

* * * * *